(12) United States Patent
Zhang et al.

(10) Patent No.: US 10,817,258 B2
(45) Date of Patent: Oct. 27, 2020

(54) CLUSTERING STORAGE METHOD AND APPARATUS

(71) Applicant: HUAWEI TECHNOLOGIES CO.,LTD., Shenzhen, Guangdong (CN)

(72) Inventors: Jinyu Zhang, Beijing (CN); Qingqing Zhou, Santa Clara, CA (US); Zhongliang Zhang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 828 days.

(21) Appl. No.: 15/360,030

(22) Filed: Nov. 23, 2016

(65) Prior Publication Data

US 2017/0075657 A1    Mar. 16, 2017

Related U.S. Application Data

(63) Continuation of application No. PCT/CN2014/092058, filed on Nov. 24, 2014.

(30) Foreign Application Priority Data

May 27, 2014 (CN) .......................... 2014 1 0228979

(51) Int. Cl.
*G06F 16/00* (2019.01)
*G06F 7/08* (2006.01)
(Continued)

(52) U.S. Cl.
CPC ............ *G06F 7/08* (2013.01); *G06F 12/0893* (2013.01); *G06F 16/221* (2019.01);
(Continued)

(58) Field of Classification Search
CPC ............... G06F 16/221; G06F 16/2282; G06F 12/0893; G06F 16/285; G06F 7/08;
(Continued)

(56) References Cited

U.S. PATENT DOCUMENTS 5,742,806 A * 4/1998 Reiner .............. G06F 16/24532
6,026,406 A    2/2000 Huang et al.
(Continued)

FOREIGN PATENT DOCUMENTS

CN    102171680 A    8/2011
CN    102314505 A    1/2012
(Continued)

OTHER PUBLICATIONS

David DeWitt, Parallel Database System: Future of High Performance Database System (the latter part), bit, Japan, Kyoritsu Publishing Co., Ltd., Jan. 1, 1994, vol. 26, No. 1, pp. 32 to 43. with partial English translation.
(Continued)

*Primary Examiner* — Merilyn P Nguyen
(74) *Attorney, Agent, or Firm* — James Anderson Harrison

(57) ABSTRACT

This disclosure provides a clustering storage method and apparatus. The method includes: storing to-be-stored first data row by row into a local memory in a database system; determining a first sorting column, where the first sorting column is used to sort data that has been cached in the local memory; sorting second data according to the first sorting column if the second data that has been cached in the local memory meets a preset condition, where the second data is data, which has been cached into the local memory, in the first data; and storing the sorted second data in a clustering manner into a storage medium in the database system.

23 Claims, 5 Drawing Sheets

(51) Int. Cl.
*G06F 16/22* (2019.01)
*G06F 16/23* (2019.01)
*G06F 16/28* (2019.01)
*G06F 12/0893* (2016.01)

(52) U.S. Cl.
CPC ...... *G06F 16/2282* (2019.01); *G06F 16/2379* (2019.01); *G06F 16/285* (2019.01); *G06F 2212/1008* (2013.01); *G06F 2212/163* (2013.01)

(58) Field of Classification Search
CPC ............. G06F 16/24539; G06F 16/217; G06F 16/24552; G06F 16/2379; G06F 16/24532; G06F 16/22; G06F 16/2365; G06F 2212/1008; G06F 2212/163; G06F 16/24561
See application file for complete search history.

(56) References Cited

U.S. PATENT DOCUMENTS

| | | | |
|---|---|---|---|
| 7,370,068 B1 | 5/2008 | Pham et al. | |
| 7,899,844 B2* | 3/2011 | Predovic | G06F 16/284 707/802 |
| 8,229,917 B1* | 7/2012 | Aneas | G06F 16/24545 707/713 |
| 2003/0158842 A1* | 8/2003 | Levy | G06F 16/24532 |
| 2005/0228964 A1 | 10/2005 | Sechrest et al. | |
| 2007/0250664 A1 | 10/2007 | Lyon | |
| 2008/0059492 A1 | 3/2008 | Tarin | |
| 2008/0104102 A1 | 5/2008 | Zhang | |
| 2008/0133493 A1 | 6/2008 | Bender | |
| 2008/0228821 A1* | 9/2008 | Mick | H04N 21/2541 |
| 2010/0088309 A1* | 4/2010 | Petculescu | G06F 16/221 707/714 |
| 2010/0088315 A1* | 4/2010 | Netz | G06F 16/24561 707/737 |
| 2010/0235335 A1* | 9/2010 | Heman | G06F 16/23 707/703 |
| 2012/0089633 A1 | 4/2012 | Vigneau | |
| 2012/0310917 A1 | 12/2012 | Sheinin et al. | |
| 2012/0323923 A1* | 12/2012 | Duan | G06F 16/24554 707/741 |
| 2013/0227244 A1 | 8/2013 | Jung et al. | |
| 2014/0095429 A1 | 4/2014 | Frantz et al. | |
| 2014/0095502 A1 | 4/2014 | Ziauddin et al. | |
| 2014/0279847 A1* | 9/2014 | Schreter | G06F 16/2228 707/609 |
| 2015/0074151 A1* | 3/2015 | Chaiken | G06F 16/221 707/803 |
| 2017/0075657 A1 | 3/2017 | Zhang et al. | |

FOREIGN PATENT DOCUMENTS

| | | |
|---|---|---|
| CN | 102521304 A | 6/2012 |
| CN | 102591864 A | 7/2012 |
| CN | 103577559 A | 2/2014 |
| CN | 103631940 A | 3/2014 |
| CN | 104021161 A | 9/2014 |
| JP | H0581342 A | 4/1993 |
| JP | H0581343 A | 4/1993 |
| JP | 2005135221 A | 5/2005 |
| KR | 20110102554 A | 9/2011 |
| KR | 20130097973 A | 9/2013 |
| KR | 20130108565 A | 10/2013 |
| KR | 20130126257 A | 11/2013 |
| RU | 2482535 C2 | 5/2013 |
| WO | 2010148415 A1 | 12/2010 |

OTHER PUBLICATIONS

Daichi Suzuki, 2 others, Study on I/O Parallelization of DBMS Query in High Speed Storage Environment, the 5th Forum on Data Enginneering and Information Management (the 11th Annual Meeting of the Database Society of Japan), Japan, the Institute of Electronics Information and Communication, Data Engineering Research Committee, the Database Society of Japan, Information Processing Society, Database System Study Group, ARG Web intelligence and interaction, Jun. 5, 2013, pp. 1 to 7. with English abstract.

Alfred Aho et al: "The design and analysis of computer algorithms" In: "The design and analysis of computer algorithms", Dec. 31, 1974, Adison Wesley, XP055515205, 479 pages.

* cited by examiner

CLUSTERING STORAGE METHOD AND APPARATUS

CROSS-REFERENCE TO RELATED APPLICATIONS

This application is a continuation of International Application No. PCT/CN2014/092058, filed on Nov. 24, 2014, which claims priority to Chinese Patent Application No. 201410228979.8, filed on May 27, 2014. The disclosures of the aforementioned applications are hereby incorporated by reference in their entireties.

TECHNICAL FIELD

The present invention relates to the field of computer technologies, and in particular, to a clustering storage method and apparatus.

BACKGROUND

In a database, data is generally stored by using a table, and there are three types of common table storage structures, which are a heap table (Heap Table), an index organization table (Index Organization Table, IOT), and a cluster table (Cluster Table).

In the prior art, when a heap table is used to store data in a storage medium, because each row of data is non-sequentially stored according to a natural sequence in which data is inserted, data loading performance and data update performance are affected slightly. Further, after the heap table is used to store data in the storage medium, if it is required to query data of the heap table for a piece of data, comparison needs to be performed row by row from the first row of the heap table until the piece of data is found.

However, when the heap table is used to store data in the storage medium, the data is non-sequentially stored, and when data is queried in the heap table, comparison needs to be performed row by row from the first row of the heap table; therefore, although the data loading performance and the data update performance are affected slightly, a data compression ratio and data query performance are relatively low.

SUMMARY

Embodiments of the present invention provide a clustering storage method and apparatus, so that data query performance and data compression efficiency can be improved on the premise that data loading performance and data update performance are affected slightly.

The following technical solutions are used in the embodiments of the present invention.

According to a first aspect, an embodiment of the present invention provides a clustering storage method, where the method is applied in a database system and includes:

caching to-be-stored first data row by row into a local memory in the database system;

determining a first sorting column, where the first sorting column is used to sort data that has been cached in the local memory;

sorting second data according to the first sorting column if the second data that has been cached in the local memory meets a preset condition, where the second data is data, which has been cached into the local memory, in the first data; and storing the sorted second data in a clustering manner into a storage medium in the database system.

In a first possible implementation manner of the first aspect, the preset condition is used to represent a relationship between a data volume of the second data that has been cached in the local memory and a data volume allowed for storage in the local memory.

With reference to the first aspect or the first possible implementation manner of the first aspect, in a second possible implementation manner, the preset condition is that a quantity of rows of the second data is greater than or equal to a first preset threshold; and the sorting second data according to the first sorting column if the second data that has been cached in the local memory meets a preset condition specifically includes:

if the quantity of rows of the second data is greater than or equal to the first preset threshold, sorting the second data according to the first sorting column.

With reference to the first aspect or the first possible implementation manner of the first aspect, in a third possible implementation manner, the preset condition is that a size, which is occupied by the second data, of the local memory is greater than or equal to a second preset threshold; and the sorting second data according to the first sorting column if the second data that has been cached in the local memory meets a preset condition specifically includes:

if the size, which is occupied by the second data, of the local memory is greater than or equal to the second preset threshold, sorting the second data according to the first sorting column.

With reference to the first aspect or any one implementation manner of the first possible implementation manner to the third possible implementation manner of the first aspect, in a fourth possible implementation manner, the sorting the second data according to the first sorting column specifically includes:

sorting the second data according to a numerical value of the first sorting column or a hash value of a numerical value of the first sorting column.

With reference to the first aspect or any one implementation manner of the first possible implementation manner to the fourth possible implementation manner of the first aspect, in a fifth possible implementation manner, the storing the sorted second data in a clustering manner into a storage medium in the database system specifically includes:

storing the sorted second data in a clustering manner into an idle physical block in the storage medium, where the idle physical block is a physical block except a physical block occupied by third data, and the third data is data, which has been stored in a clustering manner into the storage medium prior to the second data, in the first data.

With reference to the first aspect or any one implementation manner of the first possible implementation manner to the fifth possible implementation manner of the first aspect, in a sixth possible implementation manner, the first sorting column includes at least one of: a physical column and an expression.

With reference to the first aspect or any one implementation manner of the first possible implementation manner to the sixth possible implementation manner of the first aspect, in a seventh possible implementation manner, after the first data is all stored into the storage medium, the method further includes:

determining a query column; and if the query column is the first one in the first sorting column, performing a query operation on the first data according to the first one in the first sorting column.

With reference to the seventh possible implementation manner of the first aspect, in an eighth possible implementation manner, after the determining a query column and before the performing a query operation on the first data according to the first one in the first sorting column, the method further includes:

reading the first data stored in the storage medium into the local memory; where the performing a query operation on the first data according to the first one in the first sorting column specifically includes:

performing, in the local memory in a binary search manner, a query operation on each data page of one or more data pages of the first data according to the first one in the first sorting column.

With reference to the first aspect or any one implementation manner of the first possible implementation manner to the sixth possible implementation manner of the first aspect, in a ninth possible implementation manner, after the first data is all stored into the storage medium, the method further includes:

determining a second sorting column; and if the second sorting column is the first one in the first sorting column, performing a sorting operation on the first data according to the first one in the first sorting column.

With reference to the ninth possible implementation manner of the first aspect, in a tenth possible implementation manner, after the determining a second sorting column and before the performing a sorting operation on the first data according to the first one in the first sorting column, the method further includes:

reading the first data stored in the storage medium into the local memory; where the performing a sorting operation on the first data according to the first one in the first sorting column specifically includes:

performing, in the local memory, a merge sort on the first data according to the first one in the first sorting column.

With reference to the first aspect or any one implementation manner of the first possible implementation manner to the sixth possible implementation manner of the first aspect, in an eleventh possible implementation manner, after the first data is all stored into the storage medium, the method further includes:

determining an aggregation column; and if the aggregation column is the first one in the first sorting column, performing an aggregation operation on the first data according to the first one in the first sorting column, where the aggregation operation is an operation of searching the first data for a maximum value or a minimum value.

With reference to the eleventh possible implementation manner of the first aspect, in a twelfth possible implementation manner, after the determining an aggregation column and before the performing an aggregation operation on the first data according to the first one in the first sorting column, the method further includes:

reading the first data stored in the storage medium into the local memory; where the performing an aggregation operation on the first data according to the first one in the first sorting column specifically includes:

determining, in the local memory, a maximum value or a minimum value in each data page of one or more data pages of the first data according to the first one in the first sorting column; and successively comparing the maximum value or the minimum value in each data page, so as to determine a maximum value or a minimum value in the first data.

In a thirteenth possible implementation manner of the first aspect, before the caching to-be-stored first data row by row into a local memory in the database system, the method further includes:

creating a table in the storage medium, where the table is used to load the first data; where the storing the sorted second data in a clustering manner into a storage medium in the database system specifically includes:

inserting the sorted second data row by row into the table, so as to store the sorted second data in a clustering manner into the storage medium.

According to a second aspect, an embodiment of the present invention provides a clustering storage apparatus, where the apparatus is applied in a database system and includes:

a caching unit, configured to cache to-be-stored first data row by row into a local memory in the database system;

a determining unit, configured to determine a first sorting column, where the first sorting column is used to sort data that has been cached in the local memory;

an operating unit, configured to, if second data that has been cached in the local memory by the caching unit meets a preset condition, sort the second data according to the first sorting column determined by the determining unit, where the second data is data, which has been cached into the local memory, in the first data; and a storage unit, configured to store, in a clustering manner into a storage medium in the database system, the second data sorted by the operating unit.

In a first possible implementation manner of the second aspect, the preset condition is used to represent a relationship between a data volume of the second data that has been cached in the local memory and a data volume allowed for storage in the local memory.

With reference to the second aspect or the first possible implementation manner of the second aspect, in a second possible implementation manner, the preset condition is that a quantity of rows of the second data is greater than or equal to a first preset threshold; and the operating unit is specifically configured to, if the quantity of rows of the second data is greater than or equal to the first preset threshold, sort the second data according to the first sorting column.

With reference to the second aspect or the first possible implementation manner of the second aspect, in a third possible implementation manner, the preset condition is that a size, which is occupied by the second data, of the local memory is greater than or equal to a second preset threshold; and the operating unit is specifically configured to, if the size, which is occupied by the second data, of the local memory is greater than or equal to the second preset threshold, sort the second data according to the first sorting column.

With reference to the second aspect or any one implementation manner of the first possible implementation manner to the third possible implementation manner of the second aspect, in a fourth possible implementation manner, the operating unit is specifically configured to sort the second data according to a numerical value of the first sorting column or a hash value of a numerical value of the first sorting column that is determined by the determining unit.

With reference to the second aspect or any one implementation manner of the first possible implementation manner to the fourth possible implementation manner of the second aspect, in a fifth possible implementation manner, the storage unit is specifically configured to store, in a clustering manner into an idle physical block in the storage medium, the second data sorted by the operating unit, where the idle physical block is a physical block except a physical block occupied by third data, and the third data is data, which has been stored in a clustering manner into the storage medium prior to the second data, in the first data.

With reference to the second aspect or any one implementation manner of the first possible implementation manner to the fifth possible implementation manner of the second aspect, in a sixth possible implementation manner, the first sorting column determined by the determining unit includes at least one of: a physical column and an expression.

With reference to the second aspect or any one implementation manner of the first possible implementation manner to the sixth possible implementation manner of the second aspect, in a seventh possible implementation manner, the determining unit is further configured to, after the storage unit stores all the first data into the storage medium, determine a query column; and the operating unit is further configured to, if the query column determined by the determining unit is the first one in the first sorting column, perform a query operation on the first data according to the first one in the first sorting column.

With reference to the seventh possible implementation manner of the second aspect, in an eighth possible implementation manner, the caching unit is further configured to, after the determining unit determines the query column and before the operating unit performs the query operation on the first data according to the first one in the first sorting column, read the first data stored in the storage medium into the local memory; and the operating unit is specifically configured to perform, in the local memory in a binary search manner according to the first one in the first sorting column, a query operation on each data page of one or more data pages of the first data cached by the caching unit.

With reference to the second aspect or any one implementation manner of the first possible implementation manner to the sixth possible implementation manner of the second aspect, in a ninth possible implementation manner, the determining unit is further configured to, after the storage unit stores all the first data into the storage medium, determine a second sorting column; and the operating unit is further configured to, if the second sorting column determined by the determining unit is the first one in the first sorting column, perform a sorting operation on the first data according to the first one in the first sorting column.

With reference to the ninth possible implementation manner of the second aspect, in a tenth possible implementation manner, the caching unit is further configured to, after the determining unit determines the second sorting column and before the operating unit performs the sorting operation on the first data according to the first one in the first sorting column, read the first data stored in the storage medium into the local memory; and the operating unit is specifically configured to perform, in the local memory according to the first one in the first sorting column, a merge sort on the first data cached by the caching unit.

With reference to the second aspect or any one implementation manner of the first possible implementation manner to the sixth possible implementation manner of the second aspect, in an eleventh possible implementation manner, the determining unit is further configured to, after the storage unit stores all the first data into the storage medium, determine an aggregation column; and the operating unit is further configured to, if the aggregation column determined by the determining unit is the first one in the first sorting column, perform an aggregation operation on the first data according to the first one in the first sorting column, where the aggregation operation is an operation of searching the first data for a maximum value or a minimum value.

With reference to the eleventh possible implementation manner of the second aspect, in a twelfth possible implementation manner, the caching unit is further configured to, after the determining unit determines the aggregation column and before the operating unit performs the aggregation operation on the first data according to the first one in the first sorting column, read the first data stored in the storage medium into the local memory; and the operating unit is specifically configured to determine, in the local memory according to the first one in the first sorting column, a maximum value or a minimum value in each data page of one or more data pages of the first data cached by the caching unit, and successively compare the maximum value or the minimum value in each data page, so as to determine a maximum value or a minimum value in the first data.

In a thirteenth possible implementation manner of the second aspect, the clustering storage apparatus further includes a creating unit, where the creating unit is configured to, before the caching unit caches the to-be-stored first data row by row into the local memory in the database system, create a table in the storage medium, where the table is used to load the first data; and the operating unit is specifically configured to insert the sorted second data row by row into the table created by the creating unit, so as to store the sorted second data in a clustering manner into the storage medium.

According to a third aspect, an embodiment of the present invention provides a database system, including:

a bottom-layer storage medium;

a memory, coupled to the bottom-layer storage medium and configured to serve as a cache of the bottom-layer storage medium, where one or more data blocks in the bottom-layer storage medium are mapped to a target data block in the cache; and a processor, coupled to the memory, where the processor executes an instruction in the memory, configured to:

cache to-be-stored first data row by row into the memory; determine a first sorting column; sort second data according to the first sorting column if the second data that has been cached in the memory meets a preset condition; and store the sorted second data in a clustering manner into the bottom-layer storage medium, where the first sorting column is used to sort data that has been cached in the memory, and the second data is data, which has been cached into the memory, in the first data.

In a first possible implementation manner of the third aspect, the preset condition is used to represent a relationship between a data volume of the second data that has been cached in the memory and a data volume allowed for storage in the memory.

With reference to the third aspect or the first possible implementation manner of the third aspect, in a second possible implementation manner, the preset condition is that a quantity of rows of the second data is greater than or equal to a first preset threshold; and the processor is specifically configured to, if the quantity of rows of the second data is greater than or equal to the first preset threshold, sort the second data according to the first sorting column.

With reference to the third aspect or the first possible implementation manner of the third aspect, in a third possible implementation manner, the preset condition is that a size, which is occupied by the second data, of the memory is greater than or equal to a second preset threshold; and the processor is specifically configured to, if the size, which is occupied by the second data, of the memory is greater than or equal to the second preset threshold, sort the second data according to the first sorting column.

With reference to the third aspect or any one implementation manner of the first possible implementation manner to the third possible implementation manner of the third aspect, in a fourth possible implementation manner, the processor is specifically configured to sort the second data according to a numerical value of the first sorting column or a hash value of a numerical value of the first sorting column.

With reference to the third aspect or any one implementation manner of the first possible implementation manner to the fourth possible implementation manner of the third aspect, in a fifth possible implementation manner, the processor is specifically configured to store the second data in a clustering manner into an idle physical block in the bottom-layer storage medium, where the idle physical block is a physical block except a physical block occupied by third data, and the third data is data, which has been stored in a clustering manner into the bottom-layer storage medium prior to the second data, in the first data.

With reference to the third aspect or any one implementation manner of the first possible implementation manner to the fifth possible implementation manner of the third aspect, in a sixth possible implementation manner, the first sorting column determined by the processor includes at least one of: a physical column and an expression.

With reference to the third aspect or any one implementation manner of the first possible implementation manner to the sixth possible implementation manner of the third aspect, in a seventh possible implementation manner, the processor is further configured to: after the first data is all stored into the bottom-layer storage medium, determine a query column; and if the query column is the first one in the first sorting column, perform a query operation on the first data according to the first one in the first sorting column.

With reference to the seventh possible implementation manner of the third aspect, in an eighth possible implementation manner, the processor is further configured to: after determining the query column and before performing the query operation on the first data according to the first one in the first sorting column, read the first data stored in the bottom-layer storage medium into the memory; and perform, in the memory in a binary search manner, a query operation on each data page of one or more data pages of the first data according to the first one in the first sorting column.

With reference to the third aspect or any one implementation manner of the first possible implementation manner to the sixth possible implementation manner of the third aspect, in a ninth possible implementation manner, the processor is further configured to: after the first data is all stored into the bottom-layer storage medium, determine a second sorting column; and if the second sorting column is the first one in the first sorting column, perform a sorting operation on the first data according to the first one in the first sorting column.

With reference to the ninth possible implementation manner of the third aspect, in a tenth possible implementation manner, the processor is further configured to: after determining the second sorting column and before performing the sorting operation on the first data according to the first one in the first sorting column, read the first data stored in the bottom-layer storage medium into the memory; and perform, in the memory, a merge sort on the first data according to the first one in the first sorting column.

With reference to the third aspect or any one implementation manner of the first possible implementation manner to the sixth possible implementation manner of the third aspect, in an eleventh possible implementation manner, the processor is further configured to: after the first data is all stored into the bottom-layer storage medium, determine an aggregation column; and if the aggregation column is the first one in the first sorting column, perform an aggregation operation on the first data according to the first one in the first sorting column, where the aggregation operation is an operation of searching the first data for a maximum value or a minimum value.

With reference to the eleventh possible implementation manner of the third aspect, in a twelfth possible implementation manner, the processor is further configured to: after determining the aggregation column and before performing the aggregation operation on the first data according to the first one in the first sorting column, read the first data stored in the bottom-layer storage medium into the memory; determine, in the memory, a maximum value or a minimum value in each data page of one or more data pages of the first data according to the first one in the first sorting column; and successively compare the maximum value or the minimum value in each data page, so as to determine a maximum value or a minimum value in the first data.

In a thirteenth possible implementation manner of the third aspect, the processor is further configured to: before the to-be-stored first data is cached row by row into the memory, create a table in the bottom-layer storage medium; and insert the sorted second data row by row into the table, so as to store the sorted second data in a clustering manner into the bottom-layer storage medium, where the table is used to load the first data.

According to the clustering storage method and apparatus provided in the embodiments of the present invention, to-be-stored first data is cached row by row into a local memory in a database system; a first sorting column is determined, where the first sorting column is used to sort data that has been cached in the local memory; second data is sorted according to the first sorting column if the second data that has been cached in the local memory meets a preset condition, where the second data is data, which has been cached into the local memory, in the first data; and the sorted second data is stored in a clustering manner into a storage medium in the database system. By using this solution, in a process of caching the to-be-stored first data row by row into the local memory, when a data volume of the second data that has been cached in the local memory exceeds a data volume allowed for storage in the local memory, the second data starts to be sorted according to the determined first sorting column, and the sorted second data is stored into the storage medium in the database system. Because to-be-stored data may be sorted and stored part by part, so as to complete data loading, it may be ensured that data in the storage medium in the database system is partially sequential, so that it can be ensured that data query performance and data compression efficiency are improved on the premise that data loading performance and data update performance are affected slightly.

BRIEF DESCRIPTION OF DRAWINGS

To describe the technical solutions in the embodiments of the present invention or in the prior art more clearly, the following briefly introduces the tables and accompanying drawings required for describing the embodiments or the prior art. Apparently, the tables and accompanying drawings in the following description show merely some embodiments of the present invention, that is, the tables and accompanying drawings provided in the present invention include but are not limited to the tables and accompanying drawings in the following description.

DESCRIPTION OF EMBODIMENTS

Figure 1:
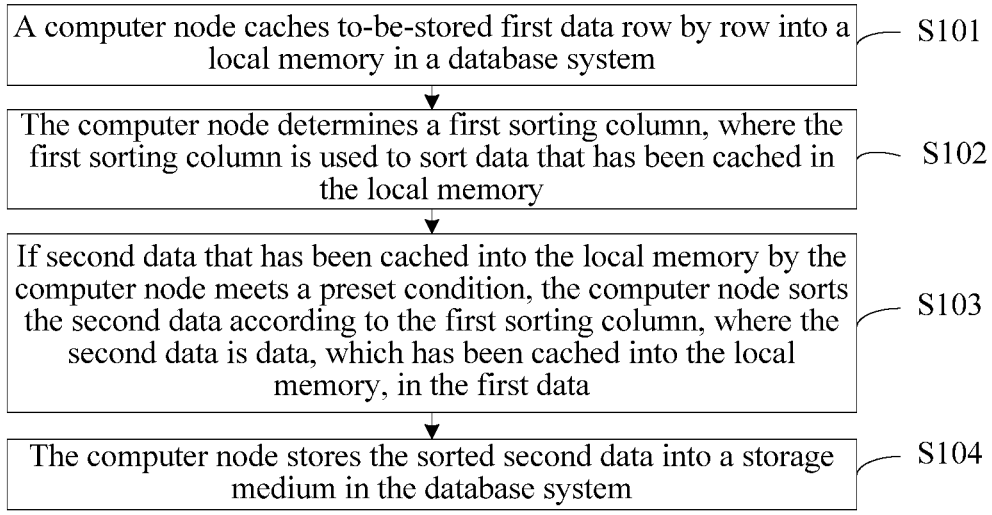
FIG. 1 is a first flowchart of a clustering storage method according to an embodiment of the present invention.

In a clustering storage method provided in the present invention, according to an idea of clustering storage, when data is stored into a storage medium in a database system, it is ensured that only data stored each time into the storage medium is sequential (data is partially sequential) without considering that all data stored in the storage medium is sequential (data is globally sequential). Therefore, compared with a case in which a heap table is used to store data in a storage medium in a non-sequential storage manner in the prior art, by using the clustering storage method provided in the present invention, because the same type of data in a storage medium is stored after being partially sorted, it can be ensured that data query performance and data compression efficiency are improved on the premise that data loading performance and data update performance are affected slightly. Specifically, by using the clustering storage method provided in the embodiments of the present invention, in one aspect, because the same type of data in a storage medium in a database system is stored after being partially sorted, after the data is stored, data query performance and data compression efficiency are relatively high; in one aspect, in a process of storing the data, when the data is loaded, because the data is loaded part by part, it can be ensured that data loading performance is affected slightly; and in another aspect, when the data in the storage medium needs to be updated, because a part of data in which to-be-updated data is located in the storage medium may be directly updated (if the update is adding, added data may be directly and sequentially stored in the storage medium), and no update is required for all data in the storage medium, it can be ensured that data update performance is affected slightly. That is, by using the clustering storage method provided in the present invention, it can be ensured that data query performance and data compression efficiency are improved on the premise that data loading performance and data update performance are affected slightly.

Further, according to the clustering storage method provided in the present invention, in a process of storing data, the data only needs to be sorted in a local memory but does not need to be sorted in a storage medium, and a speed of processing the data in the local memory is much faster than a speed of processing the data in the storage medium; therefore, when the clustering storage method provided in the present invention is used to update the data, time and a system resource can be saved.

The following clearly describes the clustering storage method and apparatus provided in the embodiments of the present invention with reference to the tables and accompanying drawings in the embodiments of the present invention. Apparently, the described embodiments are merely some instead of all of the embodiments of the present invention. The clustering storage method and apparatus provided in the embodiments of the present invention may be applied in a database system, where the database system may include a hardware entity and a database environment of the clustering storage apparatus, and the hardware entity of the clustering storage apparatus may be a computer node (or referred to as a computing node), or may be another device that can implement a clustering storage solution provided in the embodiments of the present invention, that is, the clustering storage method provided in the embodiments of the present invention may be executed by the computer node or the another device. The following uses the computer node as an example to describe the clustering storage method and apparatus provided in the embodiments of the present invention.

Embodiment 1

An embodiment of the present invention provides a clustering storage method, where the method is applied in a database system. As shown in FIG. 1, the method may include the following steps:

S101. A computer node caches to-be-stored first data row by row into a local memory in the database system.

If data stored in a text in a hard disk, that is, the to-be-stored first data needs to be stored in a storage medium in the database system, to facilitate subsequent access to the first data, in a process of storing the first data, the computer node needs to sort the first data first and then store the sorted first data into the storage medium. In a process in which the computer node stores the first data into the storage medium, the computer node first needs to read the first data from the hard disk into the local memory in the database system. Specifically, the computer node may cache the first data row by row from the hard disk into the local memory.

S102. The computer node determines a first sorting column, where the first sorting column is used to sort data that has been cached in the local memory.

In a process in which the computer node caches the first data row by row into the local memory, the computer node may determine the first sorting column, where the first sorting column may be preset and the first sorting column may be used to sort the data that has been cached in the local memory.

Optionally, in the clustering storage method provided in this embodiment of the present invention, when sorting the first data, the computer node may sort the first data according to a numerical value of the first sorting column or a hash value of a numerical value of the first sorting column.

A person skilled in the art may understand that, the storage medium in the database system provided in this embodiment of the present invention may be a disk, where the disk may include a hard disk and a floppy disk. A commonly used disk is generally a removable disk, where the removable disk may be classified into two types: One type is a USB flash drive (Universal Serial Bus flash disk, universal serial bus flash drive) or a flash disk based on chip storage; and the other type is a removable hard disk based on a hard disk, where the removable disk is a removable hard disk in most cases, and the removable hard disk is classified into a removable hard disk of a notebook computer and a removable hard disk of a desktop computer according to different hard disks. The removable hard disk is generally connected to a computer through a USB interface, that is, as a storage medium, the removable hard disk may store data that is transmitted between the removable hard disk and the computer through the USB interface.

In particular, the first sorting column may be referred to as a primary key, or may be referred to as a partial cluster key (partial cluster key).

It should be noted that, the first sorting column is a basis for sorting, when a user instructs the computer node to create a table, the first data according to a sorting column specified by an attribute of the first data, that is, the computer node may separately sort, according to the first sorting column, each part of data, which has been cached into the local memory, in the to-be-stored first data, so that each part of data in the first data is separately and sequentially arranged, to ensure that the first data is partially sequential.

Further, when instructing to create the table, the user may specify a table storage structure by using a statement, where the first sorting column is specified in the table storage structure. For example, the user may use a statement as follows: Create table t(c1 int, c2 int, partial cluster key(c1, c2+1) to specify a table t storage structure, where the table t storage structure includes the first sorting column, that is, the partial cluster key.

The table is formed by a group of data records. A table is a group of related data that is arranged according to a row; and each table includes information of a same type. The table is actually a two-dimensional table. For example, test scores of all students in a class may be stored in a table, where each row in the table corresponds to one student, and each row includes all information about the corresponding student, for example, may include the following of the student: a student number, the name, and a score of each course.

The table storage structure is a field, a type, a primary key, a foreign key, an index, and the like of a defined table, that is, these basic attributes constitute the table storage structure. After the table storage structure is determined, data of different types may be directly inserted according to the table storage structure.

A database is a warehouse for storing data, the database is formed by one table or a group of tables, and data in the database is organized in a unit of table. Each database is stored in a disk in the form of a file, that is, each database corresponds to one physical file. A different database corresponds to a physical file in a different manner. For example, a database may include one table or may include multiple tables.

Further, according to the clustering storage method provided in this embodiment of the present invention, because the computer node completes sorting for the first data in the local memory in the database system and is subject to limitations of a size and a data processing capability of the local memory, the computer node can sort the first data only part by part. The computer node then successively stores, in the storage medium in the database system, the data that is sorted part by part, and in this way, it can be ensured that the first data stored in the storage medium is partially sequential.

S103. If second data that has been cached into the local memory by the computer node meets a preset condition, the computer node sorts the second data according to the first sorting column, where the second data is data, which has been cached into the local memory, in the first data.

In the process in which the computer node caches the first data, because the local memory in the database system has a limited size and a limited data processing capability, the first data cannot all be cached into the local memory at a time, that is, the computer node may separately cache the first data part by part into the local memory, so that the computer node may successively process, part by part, the data that is separately cached into the local memory. Specifically, the computer node may collect statistics, in real time, on a situation of the second data that has been cached in the local memory. When the computer node detects that the second data that has been cached in the local memory meets the preset condition, the computer node may start to sort the second data according to the first sorting column, where the second data is the data, which has been cached into the local memory, in the first data.

Further, the foregoing preset condition may be used to represent a relationship between a data volume of the second data that has been cached in the local memory and a data volume allowed for storage in the local memory.

S104. The computer node stores the sorted second data into the storage medium in the database system.

In a database, to improve a query speed of an attribute or an attribute group, tuples that have a same value in the attribute or the attribute group (referred to as a cluster code) may be centrally stored in consecutive physical blocks. This storage method is referred to as clustering. Storing data in a clustering manner may greatly improve efficiency in performing a query according to a cluster code.

After the computer node sorts the second data, the computer node may store the sorted second data in a clustering manner into the storage medium in the database system, so as to complete a process of loading the second data.

It should be noted that, the computer node may repeatedly perform the foregoing S101 to S104 until the to-be-stored first data is all stored into the storage medium in the database system.

It may be understood that, the computer node may successively and separately sort, according to the preset first sorting column, each part of data, which has been cached into the local memory, in the first data, and store, into the storage medium, each part of data that is obtained after being sorted each time, so that it may be ensured that the first data stored in the storage medium is partially sequential, that is, each part of data in the first data stored in the storage medium is sequentially arranged.

Exemplarily, if a user needs to store first data, that is, information about 500 students in a dance department in a college into a storage medium in a database system to facilitate subsequent access, the user first needs to input the information about the 500 students into a computer node and store the information in a hard disk of the computer node in the form of a text. In a process in which the computer node stores the information about the 500 students into the storage medium in the database system according to an instruction of the user, the computer node may read the information about the 500 students from the text in the hard disk into a local memory in the database system. Specifically, the computer node may successively read the information about the 500 students into the local memory in a manner of reading information about each student row by row according to each student.

It is assumed that the information about each student includes attributes such as class, name, student number, age, specialty, and family information. According to the clustering storage method provided in this embodiment of the present invention, the information about the 500 students may constitute one table. As shown in Table 1, each row (that is, the information about each student) in Table 1 is a tuple, and each column (information of an item about all students) is an attribute.

TABLE 1

| Class | Name | Student number | Age | Specialty | Family information |
|---|---|---|---|---|---|
| 1 | A | 001 | 20 | National dance | ... |
| 1 | B | 002 | 21 | Classical dance | ... |
| 1 | C | 003 | 20 | Folk dance | ... |
| 2 | F | 001 | 19 | Tap dance | ... |
| 2 | G | 002 | 20 | Ballet | ... |
| ... | ... | ... | ... | ... | ... |
| 1 | D | 078 | 21 | Modern dance | ... |
| 1 | E | 079 | 18 | Jazz | ... |
| 2 | H | 123 | 19 | Modern dance | ... |
| 2 | I | 124 | 20 | Ballet | ... |
| ... | ... | ... | ... | ... | ... |

It should be noted that, when inputting the information about the 500 students, the user may not input the information according to a specific sequence, and therefore, the information about the 500 students stored in the text in the hard disk is not sequentially arranged. To facilitate subsequent reuse of the information about the 500 students, for example, to perform operations, such as querying and sorting, on the information about the 500 students, the information about the 500 students needs to be stored in the storage medium in the database system, so as to facilitate long-term use and avoid repeated operations. In particular, when data is to be stored into the storage medium in the database system, a corresponding table storage structure may be generally used for storage. Compared with a table storage structure provided in the prior art, a table storage structure (a storage structure of the table created by the computer node in this embodiment of the present invention) provided in this embodiment of the present invention, that is, the table storage structure shown in Table 1, can ensure that data query performance and data compression efficiency are improved on the premise that data loading performance and data update performance are affected slightly.

It can be learned from the foregoing Table 1 that: in this example, a first sorting column specified by the user, that is, a partial cluster key (primary key) may be a class and a student number. This is because each student can be determined only when the two attributes, that is, both the class and the student number are determined, that is, each student can be distinguished from another student only when both the class and the student number are determined.

By using the clustering storage method provided in this embodiment of the present invention, to-be-stored first data may be stored into a storage medium in a database system after being sorted part by part, and it may be ensured that each part of data stored in the storage medium is sequentially arranged. In this way, because to-be-stored data may be sorted and stored part by part, so as to complete data loading, it may be ensured that the data stored in the storage medium is partially sequential, so that it can be ensured that data query performance and data compression efficiency are improved on the premise that data loading performance and data update performance are affected slightly.

According to the clustering storage method provided in this embodiment of the present invention, to-be-stored first data is cached row by row into a local memory in a database system; a first sorting column is determined, where the first sorting column is used to sort data that has been cached in the local memory; second data is sorted according to the first sorting column if the second data that has been cached in the local memory meets a preset condition, where the second data is data, which has been cached into the local memory, in the first data; and the sorted second data is stored in a clustering manner into a storage medium in the database system. By using this solution, in a process of caching the to-be-stored first data row by row into the local memory, when a data volume of the second data that has been cached in the local memory exceeds a data volume allowed for storage in the local memory, the second data starts to be sorted according to the determined first sorting column, and the sorted second data is stored into the storage medium in the database system. Because to-be-stored data may be sorted and stored part by part, so as to complete data loading, it may be ensured that data in the storage medium in the database system is partially sequential, so that it can be ensured that data query performance and data compression efficiency are improved on the premise that data loading performance and data update performance are affected slightly.

Embodiment 2

Figure 2:
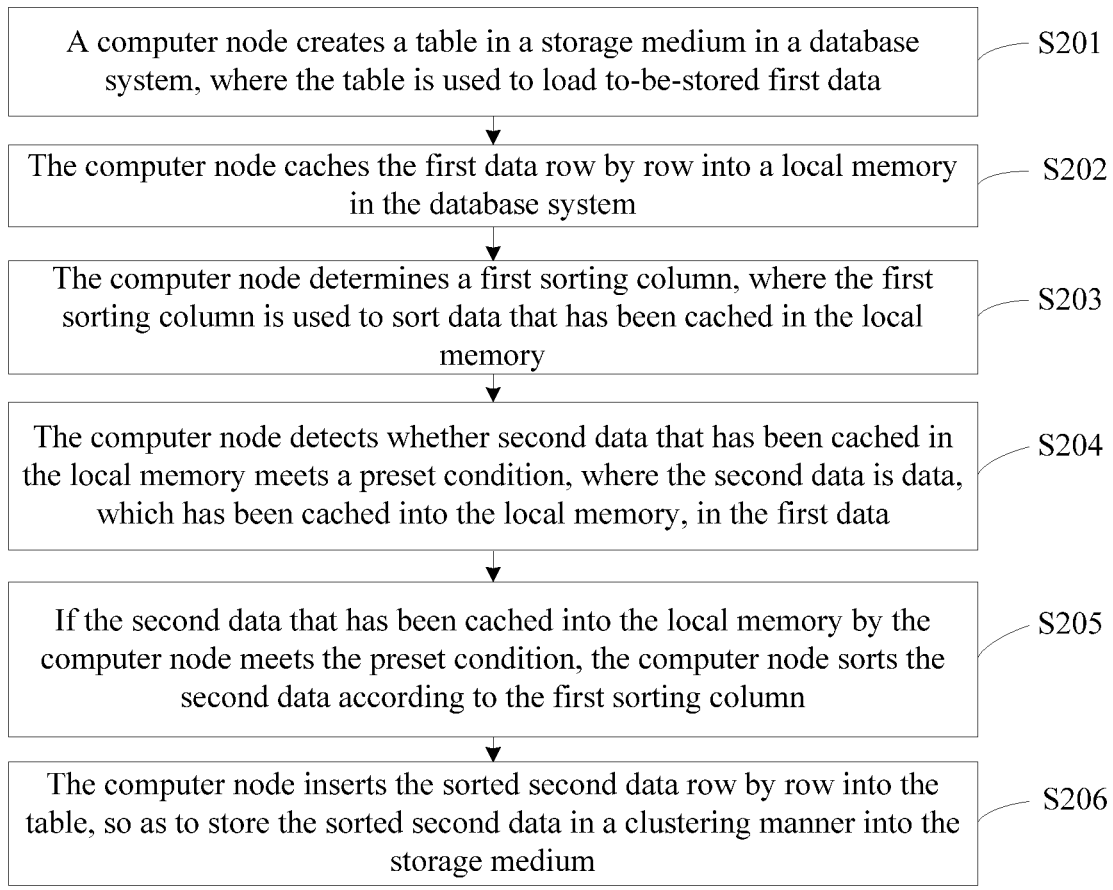
FIG. 2 is a second flowchart of a clustering storage method according to an embodiment of the present invention.

An embodiment of the present invention provides a clustering storage method, where the method is applied in a database system. As shown in FIG. 2, the method may include the following steps:

S201. A computer node creates a table in a storage medium in the database system, where the table is used to load to-be-stored first data.

If data stored in a text in a hard disk, that is, the to-be-stored first data needs to be stored in the storage medium in the database system, the computer node may first create a table in the storage medium, where the table may be used to load the first data.

A person skilled in the art may understand that, the storage medium in the database system provided in this embodiment of the present invention may be a disk, where the disk may include a hard disk and a floppy disk. A commonly used disk is generally a removable disk, where the removable disk may be classified into two types: One type is a USB flash drive or a flash disk based on chip storage; and the other type is a removable hard disk based on a hard disk, where the removable disk is a removable hard disk in most cases, and the removable hard disk is classified into a removable hard disk of a notebook computer and a removable hard disk of a desktop computer according to different hard disks. The removable hard disk is generally connected to a computer through a USB interface, that is, as a storage medium, the removable hard disk may store data that is transmitted between the removable hard disk and the computer through the USB interface.

S202. The computer node caches the first data row by row into a local memory in the database system.

In the clustering storage method provided in this embodiment of the present invention, to facilitate subsequent access to the first data, in a process of storing the first data, the computer node needs to sort the first data first and then store the sorted first data into the storage medium in the database system. In a process in which the computer node stores the first data into the storage medium, the computer node first needs to read the first data from the hard disk into the local memory in the database system. Specifically, the computer node may cache the first data row by row from the hard disk into the local memory.

S203. The computer node determines a first sorting column, where the first sorting column is used to sort data that has been cached in the local memory.

In a process in which the computer node caches the first data row by row into the local memory, the computer node may determine the first sorting column, where the first sorting column may be used to sort the data that has been cached in the local memory.

In particular, the first sorting column may be referred to as a primary key, or may be referred to as a partial cluster key.

It should be noted that, the first sorting column is a basis for sorting, when a user instructs the computer node to create a table, the first data according to a sorting column specified by an attribute of the first data, that is, the computer node may separately sort, according to the first sorting column, each part of data, which has been cached into the local memory, in the to-be-stored first data, so that each part of data in the first data is separately and sequentially arranged, to ensure that the first data is partially sequential.

Further, when instructing to create the table, the user may specify a table storage structure by using a statement, where the first sorting column is specified in the table storage structure. For example, the user may use a statement as follows:

Create table t(c1 int, c2 int, partial cluster key(c1, c2+1) to specify a table t storage structure, where the table t storage structure includes the first sorting column, that is, the partial cluster key.

The table is formed by a group of data records. A table is a group of related data that is arranged according to a row; and each table includes information of a same type. The table is actually a two-dimensional table. For example, test scores of all students in a class may be stored in a table, where each row in the table corresponds to one student, and each row includes all information about the corresponding student, for example, may include the following of the student: a student number, the name, and a score of each course.

The table storage structure is a field, a type, a primary key, a foreign key, an index, and the like of a defined table, that is, these basic attributes constitute the table storage structure. After the table storage structure is determined, data of different types may be directly inserted according to the table storage structure.

A database is a warehouse for storing data, the database is formed by one table or a group of tables, and data in the database is organized in a unit of table. Each database is stored in a disk in the form of a file, that is, each database corresponds to one physical file. A different database corresponds to a physical file in a different manner. For example, for databases in dBASE, FoxPro, and Paradox formats, a table is a separate database file, and for databases in Microsoft Access and Btrieve formats, a database file may include multiple tables.

Further, according to the clustering storage method provided in this embodiment of the present invention, because the computer node completes sorting for the first data in the local memory in the database system, and is subject to limitations of a size and a data processing capability of the local memory, the computer node can sort the first data only part by part. The computer node then successively stores, in the storage medium in the database system, the data that is sorted part by part, and in this way, it can be ensured that the first data stored in the storage medium is partially sequential.

Optionally, the foregoing first sorting column may include at least one of: a physical column and an expression. Specifically, the first sorting column may be a physical column, may be an expression, may be a physical column and an expression, or may be any other format that meets a sorting requirement, which is not limited in the present invention.

Exemplarily, the foregoing statement for specifying a first sorting column is used as an example. In the statement, the first sorting column is "c1, c2+1", where "c1" is a physical column, and "c2+1" is an expression.

Further, as shown in Table 2, if data in the table is the to-be-stored first data, the first sorting column may be an element column and a serial number column, or a numerical value column, where the element column and the serial number column, or the numerical value column may be referred to as a physical column; or the first sorting column may be an absolute value of a numerical value column, where the absolute value of the numerical value column may be referred to as an expression. It may be understood that the computer node may sort the first data shown in Table 2 according to the foregoing first sorting column that is specified by the user according to a requirement of the user.

Specifically, if the first sorting column is the element column and the serial number column, a result that is obtained after the computer node sorts the data in Table 2 according to values of the first sorting column in ascending order (sorting is performed for the element column in alphabetical order, and sorting is performed for the serial number column in numerical order) is shown in Table 3; if the first sorting column is the numerical value column, a result that is obtained after the computer node sorts the data in Table 2 according to values of the first sorting column in ascending order is shown in Table 4; and if the first sorting column is the absolute value of the numerical value column, a result that is obtained after the computer node sorts the data in Table 2 according to values of the first sorting column in ascending order is shown in Table 5.

TABLE 2

| Element | Number | Value |
|---------|--------|-------|
| A | 1 | −1 |
| B | 2 | 10 |
| B | 1 | −12 |
| A | 3 | −5 |
| A | 2 | 8 |

TABLE 3

| Element | Number | Value |
|---|---|---|
| A | 1 | −1 |
| A | 2 | 8 |
| A | 3 | −5 |
| B | 1 | −12 |
| B | 2 | 10 |

TABLE 4

| Element | Number | Value |
|---|---|---|
| B | 1 | −12 |
| A | 3 | −5 |
| A | 1 | −1 |
| A | 2 | 8 |
| B | 2 | 10 |

TABLE 5

| Element | Number | Value |
|---|---|---|
| A | 1 | 1 |
| A | 3 | 5 |
| A | 2 | 8 |
| B | 2 | 10 |
| B | 1 | 12 |

It can be seen from the foregoing Table 3, Table 4, and Table 5 that, for a different first sorting column, a sorting result is different; and for a same first sorting column, a result of sorting performed according to an expression of the first sorting column is also different from a result of sorting performed directly according to the first sorting column. Specifically, the sorting may be performed according to an actual use requirement, which is not limited in the present invention.

Optionally, a quantity of the first sorting columns may be at least one, that is, there may be at least one basis for sorting the first data. When the quantity of the first sorting columns is at least two, the at least two first sorting columns may include a primary first sorting column and at least one secondary first sorting column, so that the computer node may first sort each part of data in the first data according to the primary first sorting column, and then separately sort each part of data in the first data according to the at least one secondary first sorting column.

Exemplarily, that the foregoing first sorting column is "c1, c2+1" is used as an example, where "c1" is a primary first sorting column, and "c2+1" is a secondary first sorting column.

Further, as shown in Table 2, if the first sorting column is the element column and the serial number column, the element column may be set as the primary first sorting column, and the serial number column may be set as the secondary first sorting column; or the serial number column may be set as the primary first sorting column, and the element column may be set as the secondary first sorting column. A specific setting manner may be adaptively adjusted according to an actual requirement, which is not limited in the present invention.

S204. The computer node detects whether second data that has been cached in the local memory meets a preset condition, where the second data is data, which has been cached into the local memory, in the first data.

In the process in which the computer node caches the first data into the local memory, the computer node may detect whether the second data that has been cached in the local memory meets the preset condition, where the second data may be the data, which has been cached into the local memory, in the first data.

The preset condition may be used to represent a relationship between a data volume of the second data that has been cached in the local memory and a data volume allowed for storage in the local memory. The preset condition may be that a quantity of rows of the second data is greater than or equal to a first preset threshold, may be that a size, which is occupied by the second data, of the local memory is greater than or equal to a second preset threshold, or may be any other preset condition that meets a design requirement, which is not limited in the present invention.

Specifically, the computer node may detect whether the quantity of rows of the second data that has been cached in the local memory is greater than or equal to the first preset threshold; or the computer node may detect whether the size, which is occupied by the second data that has been cached in the local memory, of the local memory is greater than or equal to the second preset threshold.

It should be noted that, values of the first preset threshold and the second preset threshold may be set according to a memory size that is actually used by the computer node and a data processing capability of the memory, which is not limited in the present invention.

S205. If the second data that has been cached into the local memory by the computer node meets the preset condition, the computer node sorts the second data according to the first sorting column.

In the process in which the computer node caches the first data, because the local memory in the database system has a limited size and a limited data processing capability, the first data cannot all be cached into the local memory at a time, that is, the computer node may separately cache the first data part by part into the local memory, so that the computer node may successively process, part by part, the data that is separately cached into the local memory. Specifically, the computer node may collect statistics, in real time, on a situation of the second data that has been cached in the local memory. When the computer node detects that the second data that has been cached in the local memory meets the preset condition, the computer node may start to sort the second data according to the first sorting column.

For example, if the first preset threshold is 10,000 rows, when the quantity of rows of the second data that has been cached in the local memory is greater than or equal to the 10,000 rows, the computer node may start to sort the second data according to the first sorting column; and accordingly, if the second preset threshold is 6 gigabytes, when the size, which is occupied by the second data that has been cached in the local memory, of the local memory is greater than or equal to the 6 gigabytes, the computer node may start to sort the second data according to the first sorting column.

Further, the size, which is occupied by the second data that has been cached in the local memory, of the local memory may also be represented by a percentage. For example, if a capacity of the local memory is 8 gigabytes, and the second preset threshold may be 90% (percentage) of 8 gigabytes, when the size, which is occupied by the second data that has been cached in the local memory, of the local memory is greater than 90% of 8 gigabytes, the computer node may start to sort the second data according to the first sorting column.

Further, in the clustering storage method provided in this embodiment of the present invention, when sorting the first data, the computer node may sort the second data according to a numerical value of the first sorting column or a hash value of a numerical value of the first sorting column.

A binary value with an arbitrary length may be mapped to a smaller binary value with a fixed length according to a hash algorithm, and the smaller binary value with the fixed length is referred to as a hash value of the binary value. The hash value is a segment of extremely compact numerical value representation form with unique data. For example, if a hash value of a segment of data is to be calculated, as long as any character in the segment of data is changed before calculation, two hash values that are obtained by means of calculation before and after the changing are also different.

Accordingly, the hash value of the numerical value of the first sorting column may be obtained by mapping a binary value of the numerical value of the first sorting column to a smaller binary value with a fixed length according to a hash algorithm.

S206. The computer node inserts the sorted second data row by row into the table, so as to store the sorted second data in a clustering manner into the storage medium.

In a database, to improve a query speed of an attribute or an attribute group, tuples that have a same value in the attribute or the attribute group (referred to as a cluster code) may be centrally stored in consecutive physical blocks. This storage method is referred to as clustering. Storing data in a clustering manner may greatly improve efficiency in performing a query according to a cluster code.

After the computer node sorts the second data, the computer node may insert the sorted second data row by row into the table created by the computer node, so as to store the sorted second data in a clustering manner into the storage medium in the database system, so as to complete a process of loading the second data.

Specifically, the computer node may store the sorted second data in a clustering manner into an idle physical block in the storage medium in the database system, where the idle physical block is a physical block except a physical block occupied by third data, and the third data is data, which has been stored in a clustering manner into the storage medium prior to the second data, in the first data.

In particular, the computer node may store the sorted second data in a clustering manner into consecutive idle physical blocks in the storage medium, or may store the sorted second data in a clustering manner into inconsecutive idle physical blocks in the storage medium (for example, a part of data in the second data is stored in a clustering manner into some consecutive idle physical blocks, and another part of data in the second data is stored in a clustering manner into some other consecutive idle physical blocks, where the some consecutive idle physical blocks and the some other consecutive idle physical blocks are not consecutive physical blocks), and a specific storage form is not limited in the present invention. That is, no matter which one of the foregoing storage forms is used in the present invention, it can be ensured that data stored in the storage medium is partially sequential.

It should be noted that, the computer node may repeatedly perform the foregoing S202 to S206 until the to-be-stored first data is all stored into the storage medium in the database system.

It may be understood that, the computer node may successively sort each part of data, which has been cached into the local memory, in the first data, and store, into the storage medium, each part of data that is obtained after being sorted each time, so that it may be ensured that the first data stored in the storage medium is partially sequential, that is, each part of data in the first data stored in the storage medium is sequentially arranged.

Exemplarily, if a user needs to store first data, that is, information about 500 students in a dance department in a college into a storage medium in a database system to facilitate subsequent access, the user first needs to input the information about the 500 students into a computer node and store the information in a hard disk of the computer node in the form of a text. In a process in which the computer node stores the information about the 500 students into the storage medium in the database system according to an instruction of the user, the computer node may read the information about the 500 students from the text in the hard disk into a local memory in the database system. Specifically, the computer node may successively read the information about the 500 students into the local memory in a manner of reading information about each student row by row according to each student.

It is assumed that the information about each student includes attributes such as class, name, student number, age, specialty, and family information. According to the clustering storage method provided in this embodiment of the present invention, the information about the 500 students may constitute one table. As shown in Table 1, each row (that is, the information about each student) in Table 1 is a tuple, and each column (information of an item about all students) is an attribute.

It should be noted that, when inputting the information about the 500 students, the user may not input the information according to a specific sequence, and therefore, the information about the 500 students stored in the text in the hard disk is not sequentially arranged. To facilitate subsequent reuse of the information about the 500 students, for example, to perform operations, such as querying and sorting, on the information about the 500 students, the information about the 500 students needs to be stored in the storage medium in the database system, so as to facilitate long-term use and avoid repeated operations. In particular, when data is to be stored into the storage medium in the database system, a corresponding table storage structure may be generally used for storage. Compared with a table storage structure provided in the prior art, a table storage structure (a storage structure of the table created by the computer node in this embodiment of the present invention) provided in this embodiment of the present invention, that is, the table storage structure shown in Table 1, can ensure that data query performance and data compression efficiency are improved on the premise that data loading performance and data update performance are affected slightly.

It can be learned from the foregoing Table 1 that: in this example, a first sorting column specified by the user, that is, a partial cluster key (primary key) may be a class and a student number. This is because each student can be determined only when the two attributes, that is, both the class and the student number are determined, that is, each student can be distinguished from another student only when both the class and the student number are determined.

Figure 3:
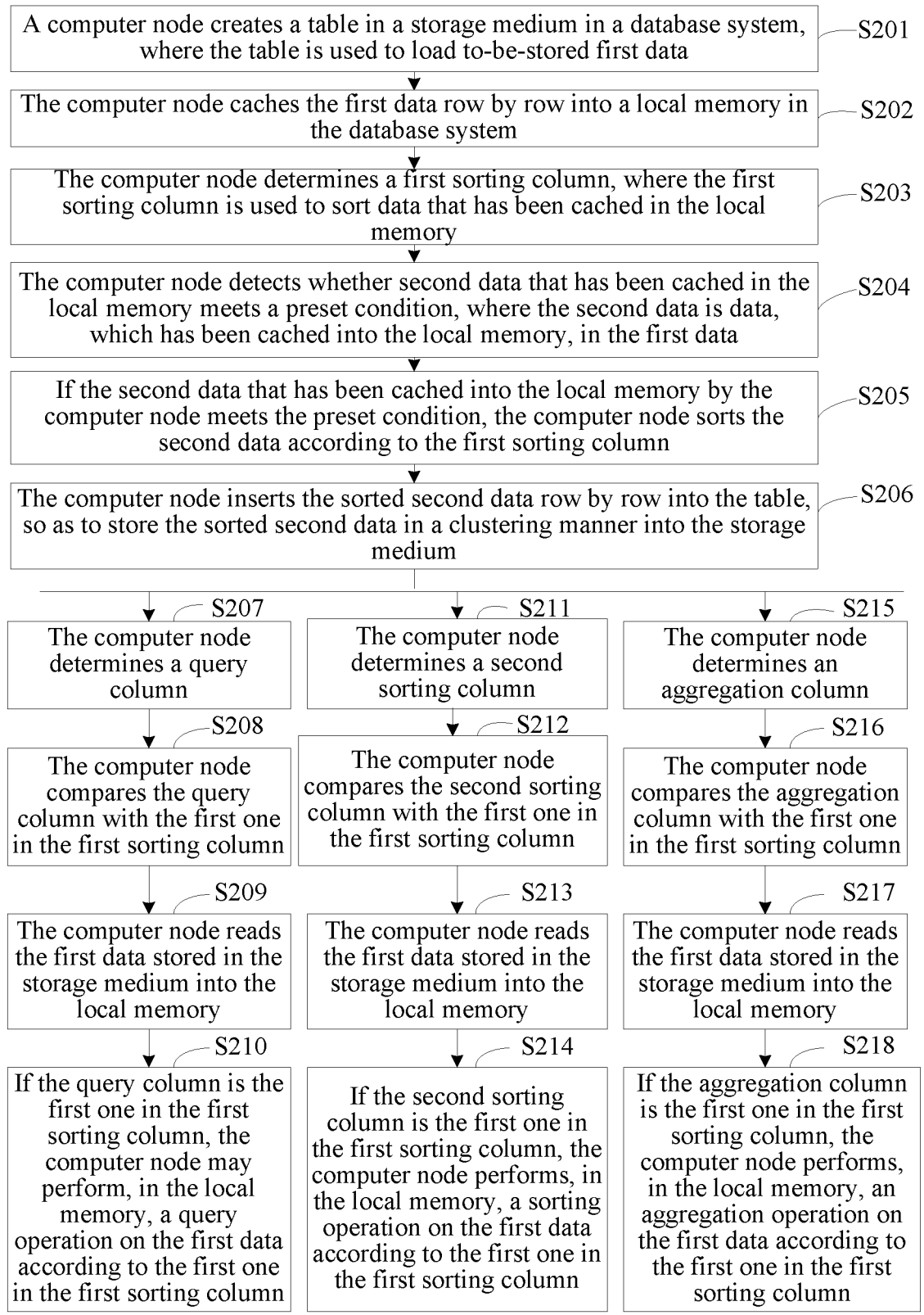
FIG. 3 is a third flowchart of a clustering storage method according to an embodiment of the present invention.

Further, as shown in FIG. 3, after the computer node stores all the first data into the storage medium, the user may perform, according to a requirement of the user, a corresponding operation such as querying, sorting, or aggregation on the first data stored in the storage medium. Specifically, the clustering storage method provided in this embodiment of the present invention may further include the following steps:

S207. The computer node determines a query column.

After the computer node stores all the first data into the storage medium, if the user needs to perform a query operation on the first data, the user needs to specify a corresponding query column, that is, the computer node may determine the query column specified by the user, where the query column may be used as a basis for performing the query operation on the first data.

S208. The computer node compares the query column with the first one in the first sorting column.

After the computer node determines the query column, the computer node may compare the query column with the first one in the first sorting column, so as to determine whether the query column is the first one in the first sorting column.

S209. The computer node reads the first data stored in the storage medium into the local memory.

After the computer node determines the query column and before the query operation is performed on the first data according to the query column, the computer node needs to read the first data stored in the storage medium into the local memory, so as to complete, in the local memory, the query operation on data.

After S207 is performed, an execution sequence between S208 and S209 is not limited in the present invention, that is, in the present invention, S208 may be performed first and then S209 is performed; S209 may be performed first and then S208 is performed; or S208 and S209 may be performed at the same time.

S210. If the query column is the first one in the first sorting column, the computer node may perform, in the local memory, a query operation on the first data according to the first one in the first sorting column.

If the query column is the first one in the first sorting column, the computer node may perform, in the local memory, the query operation on the first data according to first one in the first sorting column.

It may be understood that, if the quantity of the first sorting columns is one, the first one in the first sorting column is the first sorting column; and if the quantity of the first sorting columns is two or more than two, the first one in the first sorting columns is a primary first sorting column in the first sorting columns.

Specifically, in the clustering storage method provided in this embodiment of the present invention, because the computer node may store, in a clustering manner into the storage medium, data that is obtained after the first data is sorted part by part, it can be ensured that the first data is partially and sequentially arranged in the storage medium. Therefore, when the query operation needs to be performed on the first data according to the first one in the first sorting column, the computer node may read the first data stored in the storage medium into the local memory, and directly perform a query operation, in the local memory in a binary search manner, on each data page of one or more data pages of the first data.

A binary search is also referred to as a dichotomic search, and advantages of the binary search are as follows: a quantity of comparison times is small, a search speed is fast, and average performance is high; and disadvantages of the binary search are as follows: a to-be-searched table needs to be an ordered table, and it is relatively difficult to insert data and delete data. Therefore, a binary search manner is applicable to an ordered table that does not often change but is frequently searched. Exemplarily, it is assumed that elements in the table are arranged according to the first sorting column in ascending order, a keyword recorded in a middle position of the table is compared with a keyword of a search, and if the keyword recorded in the middle position of the table is equal to the keyword of the search, the search is successful; otherwise, the keyword recorded in the middle position is used to divide the table into two sub-tables, that is, a previous sub-table and a next sub-table, and if the keyword recorded in the middle position of the table is greater than the keyword of the search, the previous sub-table is further searched, and otherwise, the next sub-table is further searched. The foregoing process is repeated until data that meets a query condition is found, and in this case, the search is successful; or the foregoing process is repeated until a sub-table does not exist, and in this case, the search is not successful.

It should be noted that, because the first data is partially and sequentially arranged in the storage medium, the first data that is read by the computer node from the storage medium into the local memory is also partially and sequentially arranged. If the first data needs to be queried according to the first one in the first sorting column, the computer node may rapidly find, in the first data in the local memory by performing the foregoing S207 to S210, the data that meets the query condition, thereby reducing quantities of times of browsing data and comparing data, and improving data query performance.

Figure 4:
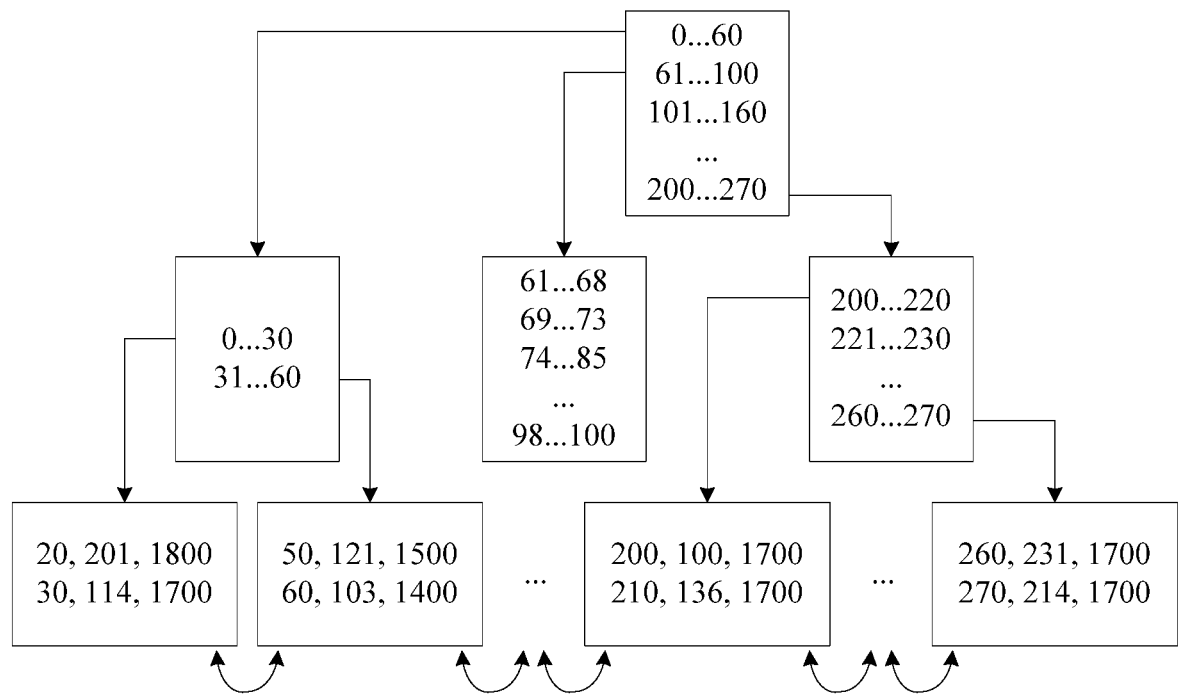
FIG. 4 is a schematic structural diagram of an index organization table according to an embodiment of the present invention.

Further, in the clustering storage method provided in this embodiment of the present invention, as shown in FIG. 4, an index corresponding to the first data may also be used to query data. The index corresponding to the first data may be created in the process of storing the first data into the storage medium, or the index corresponding to the first data may be created after the first data is stored into the storage medium, which is not limited in the present invention.

It may be understood that the index corresponding to the first data may be used to indicate a specific storage location of the first data in the storage medium. For example, the index corresponding to the first data may be used to indicate a physical block, a data page and a data row in which the first data is specifically stored in the storage medium.

Specifically, after the first data is stored into the storage medium by using the clustering storage method provided in this embodiment of the present invention, because the first data is partially and sequentially stored, a data row that needs to be searched for may be directly found in the storage medium according to the query column and the created index that corresponds to the first data. Therefore, compared with a case in which data is non-sequentially stored in the prior art, a quantity of times of querying data is greatly reduced and data query performance is improved.

In particular, because a method for searching data according to the index corresponding to the first data is similar to a method for searching data according to an index in the prior art, details are not described herein again.

S211. The computer node determines a second sorting column.

After the computer node stores all the first data into the storage medium, if the user needs to sort the first data, the user needs to specify a corresponding sorting column, that is, the computer node may determine the second sorting column specified by the user, where the second sorting column may be used as a basis for performing a sorting operation on the first data.

S212. The computer node compares the second sorting column with the first one in the first sorting column.

After the computer node determines the second sorting column, the computer node may compare the second sorting column with the first one in the first sorting column, so as to determine whether the second sorting column is the first one in the first sorting column.

S213. The computer node reads the first data stored in the storage medium into the local memory.

After the computer node determines the second sorting column and before the sorting operation is performed on the first data according to the second sorting column, the computer node needs to read the first data stored in the storage medium into the local memory, so as to complete, in the local memory, the sorting operation on data.

After S211 is performed, an execution sequence between S212 and S213 is not limited in the present invention, that is, in the present invention, S212 may be performed first and then S213 is performed; S213 may be performed first and then S212 is performed; or S212 and S213 may be performed at the same time.

S214. If the second sorting column is the first one in the first sorting column, the computer node performs, in the local memory, a sorting operation on the first data according to the first one in the first sorting column.

If the second sorting column is the first one in the first sorting column, the computer node may perform, in the local memory, the sorting operation on the first data according to the first one in the first sorting column.

Specifically, in the clustering storage method provided in this embodiment of the present invention, because the computer node may store, in a clustering manner into the storage medium, data that is obtained after the first data is sorted part by part, it can be ensured that the first data is partially and sequentially arranged in the storage medium. Therefore, when the sorting operation needs to be performed on the first data according to the first one in the first sorting column, the computer node may read the first data stored in the storage medium into the local memory, and directly sort, in the local memory, each part of data in the first data, that is, the computer node may perform a merge sort on the first data.

The merge (Merge) sort is a sorting method for combining two (or more than two) ordered sequences into a new ordered sequence. The merge sort is an effective sorting algorithm that is based on a merge operation. The merge sort provided in this embodiment of the present invention may be as follows: The computer node combines several ordered subsequences that are stored in a clustering manner into the storage medium into an integral ordered sequence.

It should be noted that, because the first data is partially and sequentially arranged in the storage medium, the first data that is read by the computer node from the storage medium into the local memory is also partially and sequentially arranged. If the first data needs to be sorted according to the first one in the first sorting column, the computer node may rapidly sort the first data, in the local memory by performing the foregoing S211 to S214, so that efficiency in sorting data can be improved.

S215. The computer node determines an aggregation column.

After the computer node stores all the first data into the storage medium, if the user needs to perform an aggregation operation on the first data, the user needs to specify a corresponding aggregation column, that is, the computer node may determine the aggregation column specified by the user, where the aggregation column may be used as a basis for performing the aggregation operation on the first data.

It should be noted that, in the clustering storage method provided in this embodiment of the present invention, the aggregation operation is an operation of searching the first data for a maximum value or a minimum value.

S216. The computer node compares the aggregation column with the first one in the first sorting column.

After the computer node determines the aggregation column, the computer node may compare the aggregation column with the first one in the first sorting column, so as to determine whether the aggregation column is the first one in the first sorting column.

S217. The computer node reads the first data stored in the storage medium into the local memory.

After the computer node determines the aggregation column and before the aggregation operation is performed on the first data according to the aggregation column, the computer node needs to read the first data stored in the storage medium into the local memory, so as to complete, in the local memory, the aggregation operation on data.

After S215 is performed, an execution sequence between S216 and S217 is not limited in the present invention, that is, in the present invention, S216 may be performed first and then S217 is performed; S217 may be performed first and then S216 is performed; or S216 and S217 may be performed at the same time.

S218. If the aggregation column is the first one in the first sorting column, the computer node may perform, in the local memory, an aggregation operation on the first data according to the first one in the first sorting column.

If the aggregation column is the first one in the first sorting column, the computer node may perform, in the local memory, the aggregation operation on the first data according to the first one in the first sorting column.

Further, a method in which the computer node performs the aggregation operation on the first data according to the first one in the first sorting column may specifically include:

(1) The computer node may determine, in the local memory, a maximum value or a minimum value in each data page of one or more data pages of the first data according to the first one in the first sorting column.

(2) The computer node successively compares the maximum value or the minimum value in each data page, so as to determine a maximum value or a minimum value in the first data.

Further, in the clustering storage method provided in this embodiment of the present invention, because the computer node may store, in a clustering manner into the storage medium, data that is obtained after the first data is sorted part by part, the first data is partially and sequentially arranged in the storage medium. Therefore, when the aggregation operation needs to be performed on the first data according to the first one in the first sorting column, the computer node may read the first data stored in the storage medium into the local memory; and by using the foregoing method, the computer node first determines, in the local memory, the maximum value or the minimum value in each data page of one or more data pages of the first data according to the first one in the first sorting column, and then the computer node successively compares the maximum value or the minimum value in each data page, so as to determine the maximum value or the minimum value in the first data.

It should be noted that, because the first data is partially and sequentially arranged in the storage medium, the first data that is read by the computer node from the storage medium into the local memory is also partially and sequentially arranged. If the aggregation operation needs to be performed on the first data according to the first one in the first sorting column, the computer node may rapidly complete, in the local memory by performing the foregoing S215 to S218, the aggregation operation on the first data, that is, the computer node can rapidly determine the maximum value or the minimum value in the first data, thereby improving efficiency in aggregating data.

Further, in the clustering storage method provided in this embodiment of the present invention, as shown in FIG. 4, the aggregation operation may also be performed on data by using the index corresponding to the first data. The index corresponding to the first data may be created in the process of storing the first data into the storage medium, or the index corresponding to the first data may be created after the first data is stored into the storage medium, which is not limited in the present invention.

It may be understood that the index corresponding to the first data may be used to indicate a specific storage location of the first data in the storage medium. For example, the index corresponding to the first data may be used to indicate a physical block, a data page and a data row in which the first data is specifically stored in the storage medium.

Specifically, after the first data is stored into the storage medium by using the clustering storage method provided in this embodiment of the present invention, because the first data is partially and sequentially stored, the maximum value or the minimum value in each data page of one or more data pages may be directly found in the storage medium according to the aggregation column and the created index that corresponds to the first data. Therefore, compared with a case in which data is non-sequentially stored in the prior art, a quantity of times of performing an aggregation operation on data is greatly reduced and data aggregation performance is improved.

In particular, because a method for performing an aggregation operation on data according to the index corresponding to the first data is similar to that in the prior art, details are not described herein again.

It may be understood that execution sequences of S207 to S210, S211 to S214, and S215 to S218 are not limited in the present invention, that is, after the first data is all stored into the storage medium, a step that needs to be performed may be selected according to an actual operation requirement. For example, in examples corresponding to the foregoing operations such as querying, sorting, and aggregation on the first data, if the query operation needs to be performed on the first data, the computer node may perform S207 to S210; if the sorting operation needs to be performed on the first data, the computer node may perform S211 to S214; and if the aggregation operation needs to be performed on the first data, the computer node may perform S215 to S218.

Further, the foregoing listed various operations performed on the first data are merely exemplary, after the first data is stored by using the clustering storage method provided in this embodiment of the present invention, a corresponding operation may be further performed on the first data according to another corresponding requirement, which is not limited in the present invention.

Exemplarily, as shown in Table 6, Table 6 shows actual test data between sequential storage provided in the prior art and partially sequential clustering storage provided in this embodiment of the present invention when TPCH (a business intelligence computing test standard) is applied to test data. TPCH is released by the Transaction Processing Performance Council (Transaction Processing Performance Council, TPC), and TPCH can simulate a database operation in a decision support system to test response time of a complex query in the database system.

TABLE 6

| TPCH query (10 gigabytes) | Sequential storage (millisecond) | Partially sequential clustering storage (millisecond) | Improvement ratio (%) |
| --- | --- | --- | --- |
| Q6 | 1532.718 | 162.305 | 944.34 |
| Q7 | 12078.286 | 10720.884 | 112.66 |
| Q8 | 3697.182 | 3457.124 | 106.94 |
| Q9 | 9568.726 | 8475.160 | 112.90 |
| Q10 | 5266.391 | 3879.315 | 135.76 |
| Q12 | 6346.369 | 1779.304 | 356.68 |
| Q13 | 5722.073 | 5407.703 | 105.81 |
| Q14 | 1962.829 | 788.632 | 248.89 |
| Q15 | 2100.047 | 658.865 | 318.74 |

It can be seen from Table 6 that, time for testing data by applying TPCH when the sequential storage method provided in the prior art is used to store the data is far longer than time for testing data by applying TPCH when the clustering storage method provided in this embodiment of the present invention is used to store the data. That is, by using the clustering storage method provided in this embodiment of the present invention to store data, the time for testing data by applying TPCH can be reduced, thereby improving test performance of testing data by applying TPCH.

Further, as shown in Table 6, in an operation of querying data by applying TPCH, compared with the sequential storage provided in the prior art, in the partially sequential clustering storage provided in this embodiment of the present invention, query performance of querying data by applying TPCH is obviously improved. Especially, improvement ratios of query performance of three queries Q6, Q12, and Q15 are above 300%.

It should be noted that the clustering storage method provided in this embodiment of the present invention may be applied in a scenario of a single table in a database system, or may be applied in a scenario in which multiple tables in a database system serve as joins (join). Specifically, the clustering storage method provided in this embodiment of the present invention may be applied according to an actual use requirement, which is not limited in the present invention.

By using the clustering storage method provided in this embodiment of the present invention, to-be-stored first data may be stored into a storage medium in a database system after being sorted part by part, and it may be ensured that each part of data stored in the storage medium is sequentially arranged. In this way, because to-be-stored data may be sorted and stored part by part, so to complete data loading, it may be ensured that the data stored in the storage medium is partially sequential, so that it can be ensured that data query performance and data compression efficiency are improved on the premise that data loading performance and data update performance are affected slightly.

According to the clustering storage method provided in this embodiment of the present invention, to-be-stored first data is cached row by row into a local memory in a database system; a first sorting column is determined, where the first sorting column is used to sort data that has been cached in the local memory; second data is sorted according to the first sorting column if the second data that has been cached in the local memory meets a preset condition, where the second data is data, which has been cached into the local memory, in the first data; and the sorted second data is stored in a clustering manner into a storage medium in the database system. By using this solution, in a process of caching the to-be-stored first data row by row into the local memory, when a data volume of the second data that has been cached in the local memory exceeds a data volume allowed for storage in the local memory, the second data starts to be sorted according to the determined first sorting column, and the sorted second data is stored into the storage medium in the database system. Because to-be-stored data may be sorted and stored part by part, so as to complete data loading, it may be ensured that data in the storage medium in the database system is partially sequential, so that it can be ensured that data query performance and data compression efficiency are improved on the premise that data loading performance and data update performance are affected slightly.

Embodiment 3

Figure 5:
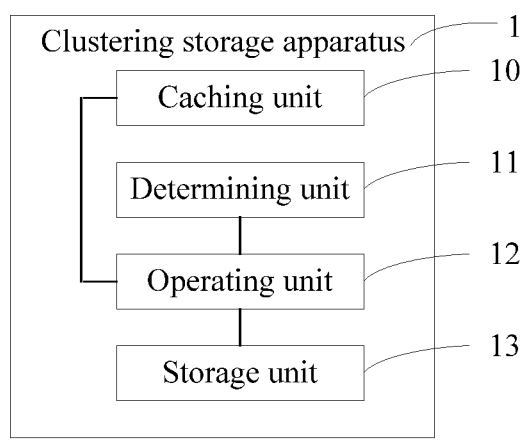
FIG. 5 is a first schematic structural diagram of a clustering storage apparatus according to an embodiment of the present invention.

As shown in FIG. 5, an embodiment of the present invention provides a clustering storage apparatus 1, where the apparatus is applied in a database system. The clustering storage apparatus 1 may include:

a caching unit 10, configured to cache to-be-stored first data row by row into a local memory in the database system;

a determining unit 11, configured to determine a first sorting column, where the first sorting column is used to sort data that has been cached in the local memory;

an operating unit 12, configured to, if second data that has been cached by the caching unit 10 in the local memory meets a preset condition, sort the second data according to the first sorting column determined by the determining unit 11, where the second data is data, which has been cached into the local memory, in the first data; and a storage unit 13, configured to store, in a clustering manner into a storage medium in the database system, the second data sorted by the operating unit 12.

Optionally, the preset condition is used to represent a relationship between a data volume of the second data that has been cached in the local memory and a data volume allowed for storage in the local memory.

Optionally, the preset condition is that a quantity of rows of the second data is greater than or equal to a first preset threshold; and the operating unit 12 is specifically configured to, if the quantity of rows of the second data that has been cached by the caching unit 10 in the local memory is greater than or equal to the first preset threshold, sort the second data according to the first sorting column.

Optionally, the preset condition is that a size, which is occupied by the second data, of the local memory is greater than or equal to a second preset threshold; and the operating unit 12 is specifically configured to: if the size, which is occupied by the second data that has been cached by the caching unit 10 in the local memory, of the local memory is greater than or equal to the second preset threshold, sort the second data according to the first sorting column.

Optionally, the operating unit 12 is specifically configured to sort the second data according to a numerical value of the first sorting column or a hash value of a numerical value of the first sorting column that is determined by the determining unit 11.

Optionally, the storage unit 13 is specifically configured to store, in a clustering manner into an idle physical block in the storage medium, the second data sorted by the operating unit 12, where the idle physical block is a physical block except a physical block occupied by third data, and the third data is data, which has been stored in a clustering manner into the storage medium prior to the second data, in the first data.

Optionally, the first sorting column determined by the determining unit 11 includes at least one of: a physical column and an expression.

Optionally, the determining unit 11 is further configured to, after the storage unit 13 stores all the first data into the storage medium, determine a query column; and the operating unit 12 is further configured to, if the query column determined by the determining unit 11 is the first one in the first sorting column, perform a query operation on the first data according to the first one in the first sorting column.

Further, the caching unit 10 is further configured to, after the determining unit 11 determines the query column and before the operating unit 12 performs the query operation on the first data according to the first one in the first sorting column, read the first data stored in the storage medium into the local memory; and the operating unit 12 is specifically configured to perform, in the local memory in a binary search manner according to the first one in the first sorting column, a query operation on each data page of one or more data pages of the first data cached by the caching unit 10.

Optionally, the determining unit 11 is further configured to, after the storage unit 13 stores all the first data into the storage medium, determine a second sorting column; and the operating unit 12 is further configured to, if the second sorting column determined by the determining unit 11 is the first one in the first sorting column, perform a sorting operation on the first data according to the first one in the first sorting column.

Further, the caching unit 10 is further configured to, after the determining unit 11 determines the second sorting column and before the operating unit 12 performs the sorting operation on the first data according to the first one in the first sorting column, read the first data stored in the storage medium into the local memory; and the operating unit 12 is specifically configured to perform, in the local memory according to the first one in the first sorting column, a merge sort on the first data cached by the caching unit 10.

Optionally, the determining unit 11 is further configured to, after the storage unit 13 stores all the first data into the storage medium, determine an aggregation column; and the operating unit 12 is further configured to: if the aggregation column determined by the determining unit 11 is the first one in the first sorting column, perform an aggregation operation on the first data according to the first one in the first sorting column, where the aggregation operation is an operation of searching the first data for a maximum value or a minimum value.

Further, the caching unit 10 is further configured to, after the determining unit 11 determines the aggregation column and before the operating unit 12 performs the aggregation operation on the first data according to the first one in the first sorting column, read the first data stored in the storage medium into the local memory; and the operating unit 12 is specifically configured to determine, in the local memory according to the first one in the first sorting column, a maximum value or a minimum value in each data page of one or more data pages of the first data cached by the caching unit 10, and successively compare the maximum value or the minimum value in each data page, so as to determine a maximum value or a minimum value in the first data.

Figure 6:
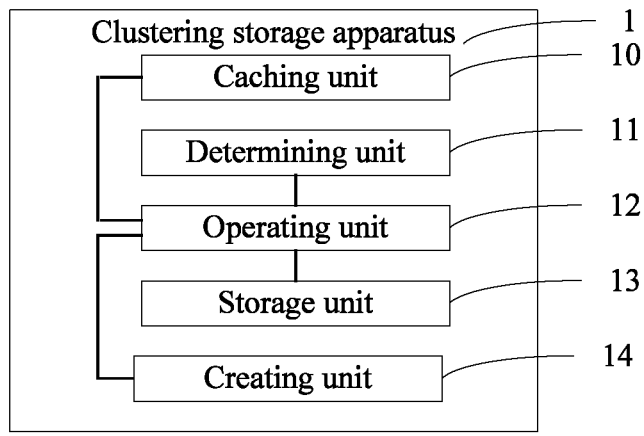
FIG. 6 is a second schematic structural diagram of a clustering storage apparatus according to an embodiment of the present invention.

Further, as shown in FIG. 6, the clustering storage apparatus 1 provided in this embodiment of the present invention further includes a creating unit 14, where the creating unit 14 is configured to, before the caching unit 10 caches the to-be-stored first data row by row into the local memory in the database system, create a table in the storage medium, where the table is used to load the first data; and the operating unit 12 is specifically configured to insert the sorted second data row by row into the table created by the creating unit 14, so as to store the sorted second data in a clustering manner into the storage medium.

Optionally, a quantity of the first sorting columns determined by the determining unit 11 is at least one, where when the quantity of the first sorting columns is at least two, the at least two first sorting columns include a primary first sorting column and at least one secondary first sorting column.

According to the clustering storage apparatus provided in this embodiment of the present invention, the clustering storage apparatus caches to-be-stored first data row by row into a local memory in a database system, and determines a first sorting column, where the first sorting column is used to sort data that has been cached in the local memory; if second data that has been cached in the local memory meets a preset condition, the clustering storage apparatus sorts the second data according to the first sorting column, where the second data is data, which has been cached into the local memory, in the first data; and the clustering storage apparatus stores the sorted second data in a clustering manner into a storage medium in the database system. By using this solution, in a process in which the clustering storage apparatus caches the to-be-stored first data row by row into the local memory, when a data volume of the second data that has been cached in the local memory exceeds a data volume allowed for storage in the local memory, the clustering storage apparatus starts to sort the second data according to the determined first sorting column, and store the sorted second data in the storage medium in the database system. Because to-be-stored data may be sorted and stored part by part, so as to complete data loading, it may be ensured that data in the storage medium in the database system is partially sequential, so that it can be ensured that data query performance and data compression efficiency are improved on the premise that data loading performance and data update performance are affected slightly.

Embodiment 4

Figure 7:
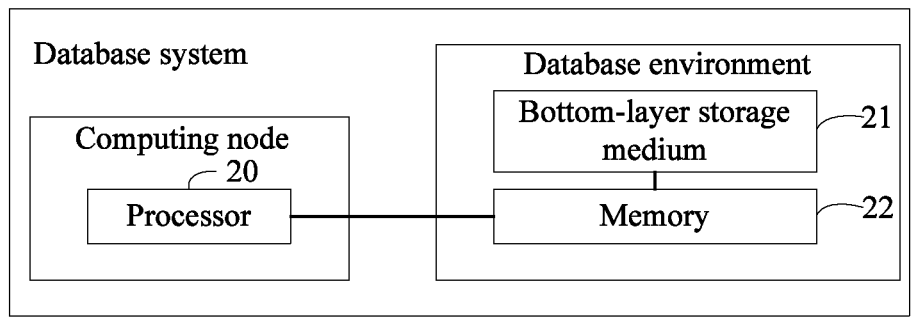
FIG. 7 is a schematic structural diagram of a database system according to an embodiment of the present invention.

As shown in FIG. 7, an embodiment of the present invention provides a database system, where the database system may include a hardware entity and a software environment. The hardware entity may be a computer node and the software environment may be a database environment, where the computer node may include a processor 20, and the database environment may include a bottom-layer storage medium 21 and a memory 22, where the bottom-layer storage medium 21 is configured to store to-be-stored first data;

the memory 22 is coupled to the bottom-layer storage medium 21 and is used to serve as a cache of the bottom-layer storage medium 21, and it should be understood that one or more data blocks in the bottom-layer storage medium 21 are mapped to a target data block in the cache; and the processor 20 is coupled to the memory 22, and the processor 20 executes an instruction in the memory 22, so as to:

cache the to-be-stored first data row by row into the memory 22; determine a first sorting column; sort second data according to the first sorting column if the second data that has been cached in the memory 22 meets a preset condition; and store the sorted second data in a clustering manner into the bottom-layer storage medium 21, where the first sorting column is used to sort data that has been cached in the memory 22, and the second data is data, which has been cached into the memory 22, in the first data.

Optionally, the preset condition is used to represent a relationship between a data volume of the second data that has been cached in the memory 22 and a data volume allowed for storage in the memory 22.

Optionally, the preset condition is that a quantity of rows of the second data is greater than or equal to a first preset threshold; and the processor 20 is specifically configured to, if the quantity of rows of the second data that has been cached in the memory 22 is greater than or equal to the first preset threshold, sort the second data according to the first sorting column.

Optionally, the preset condition is that a size, which is occupied by the second data, of the memory 22 is greater than or equal to a second preset threshold; and the processor 20 is specifically configured to, if the size, which is occupied by the second data that has been cached in the memory 22, of the memory 22 is greater than or equal to the second preset threshold, sort the second data according to the first sorting column.

Optionally, the processor 20 is specifically configured to sort the second data according to a numerical value of the first sorting column or a hash value of a numerical value of the first sorting column.

Optionally, the processor 20 is specifically configured to store the sorted second data in a clustering manner into an idle physical block in the bottom-layer storage medium 21, where the idle physical block is a physical block except a physical block occupied by third data, and the third data is data, which has been stored in a clustering manner into the bottom-layer storage medium 21 prior to the second data, in the first data.

Optionally, the first sorting column determined by the processor 20 includes at least one of: a physical column and an expression.

Optionally, the processor 20 is further configured to: after the first data is all stored into the bottom-layer storage medium 21, determine a query column; determine whether the query column is the first one in the first sorting column; and if it is determined that the query column is the first one in the first sorting column, perform a query operation on the first data according to the first one in the first sorting column, and output a query result.

Further, the processor 20 is further configured to, after determining the query column and before performing the query operation on the first data according to the first one in the first sorting column, read the first data stored in the bottom-layer storage medium 21 into the memory 22; and the processor 20 is specifically configured to perform, in the memory 22 in a binary search manner, a query operation on each data page of one or more data pages of the first data according to the first one in the first sorting column, and output the query result.

Optionally, the processor 20 is further configured to: after the first data is all stored into the bottom-layer storage medium 21, determine a second sorting column; determine whether the second sorting column is the first one in the first sorting column; and if it is determined that the second sorting column is the first one in the first sorting column, perform a sorting operation on the first data according to the first one in the first sorting column, and output the sorted first data.

Further, the processor 20 is further configured to, after determining the second sorting column and before performing the sorting operation on the first data according to the first one in the first sorting column, read the first data stored in the bottom-layer storage medium 21 into the memory 22; and the processor 20 is specifically configured to: perform, in the memory 22, a merge sort on the first data according to the first one in the first sorting column, and output the sorted first data.

Optionally, the processor 20 is further configured to: after the first data is all stored into the bottom-layer storage medium 21, determine an aggregation column; determine whether the aggregation column is the first one in the first sorting column; and if it is determined that the aggregation column is the first one in the first sorting column, perform an aggregation operation on the first data according to the first one in the first sorting column, and output a result of performing the aggregation operation, where the aggregation operation is an operation of searching the first data for a maximum value or a minimum value.

Further, the processor 20 is further configured to, after determining the aggregation column and before performing the aggregation operation on the first data according to the first one in the first sorting column, read the first data stored in the bottom-layer storage medium 21 into the memory 22; and the processor 20 is specifically configured to determine, in the memory 22, a maximum value or a minimum value in each data page of one or more data pages of the first data according to the first one in the first sorting column; successively compare the maximum value or the minimum value in each data page, so as to determine a maximum value or a minimum value in the first data; and output the maximum value or the minimum value.

Further, the processor 20 is further configured to, before the to-be-stored first data is cached row by row into the memory 22, create a table in the bottom-layer storage medium 21, where the table is used to load the first data; and the processor 20 is specifically configured to insert the sorted second data row by row into the table, so as to store the sorted second data in a clustering manner into the bottom-layer storage medium 21.

Optionally, a quantity of the first sorting columns determined by the processor 20 is at least one, where when the quantity of the first sorting columns is at least two, the at least two first sorting columns include a primary first sorting column and at least one secondary first sorting column.

In this embodiment of the present invention, the computer node may be a computer or any other device that can store data in a clustering manner, which is not limited in the present invention. That is, both an apparatus and a device that can implement the clustering storage method provided in the embodiment of the present invention shall fall within the protection scope of the present invention.

According to the database system provided in this embodiment of the present invention, a computer node in the database system caches to-be-stored first data row by row into a memory in the database system, and determines a first sorting column, where the first sorting column is used to sort data that has been cached in the memory; if second data that has been cached in the memory meets a preset condition, the computer node sorts the second data according to the first sorting column, where the second data is data, which has been cached into the memory, in the first data; and the computer node stores the sorted second data in a clustering manner into a bottom-layer storage medium in the database system. By using this solution, in a process in which the computer node caches the to-be-stored first data row by row into the memory, when a data volume of the second data that has been cached in the memory exceeds a data volume allowed for storage in the memory, the computer node starts to sort the second data according to the determined first sorting column, and store the sorted second data into the bottom-layer storage medium. Because to-be-stored data may be sorted and stored part by part, so as to complete data loading, it may be ensured that data in the bottom-layer storage medium in the database system is partially sequential, so that it can be ensured that data query performance and data compression efficiency are improved on the premise that data loading performance and data update performance are affected slightly.

Embodiment 5

Figure 8:
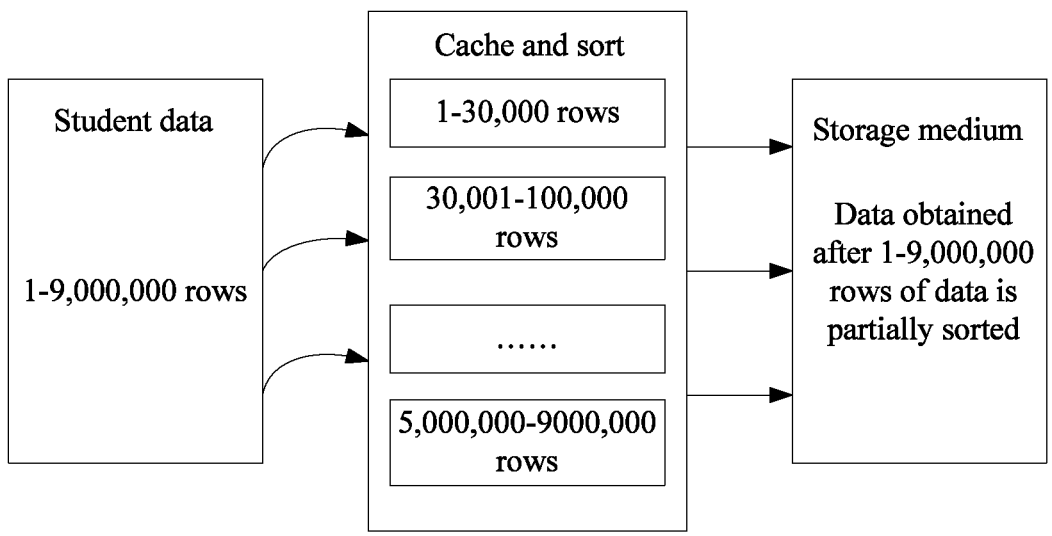
FIG. 8 is a first schematic diagram for storing data in a clustering manner according to an embodiment of the present invention.

To understand the clustering storage method provided in the embodiment of the present invention more clearly, the following uses a specific example to further describe the clustering storage method provided in the embodiment of the present invention. As shown in FIG. 8, it is assumed that to-be-stored first data is 9,000,000 rows of student data, and specifically, each row of data indicates information related to each student, such as class, student number, and name that are shown in FIG. 9.

Figure 9:
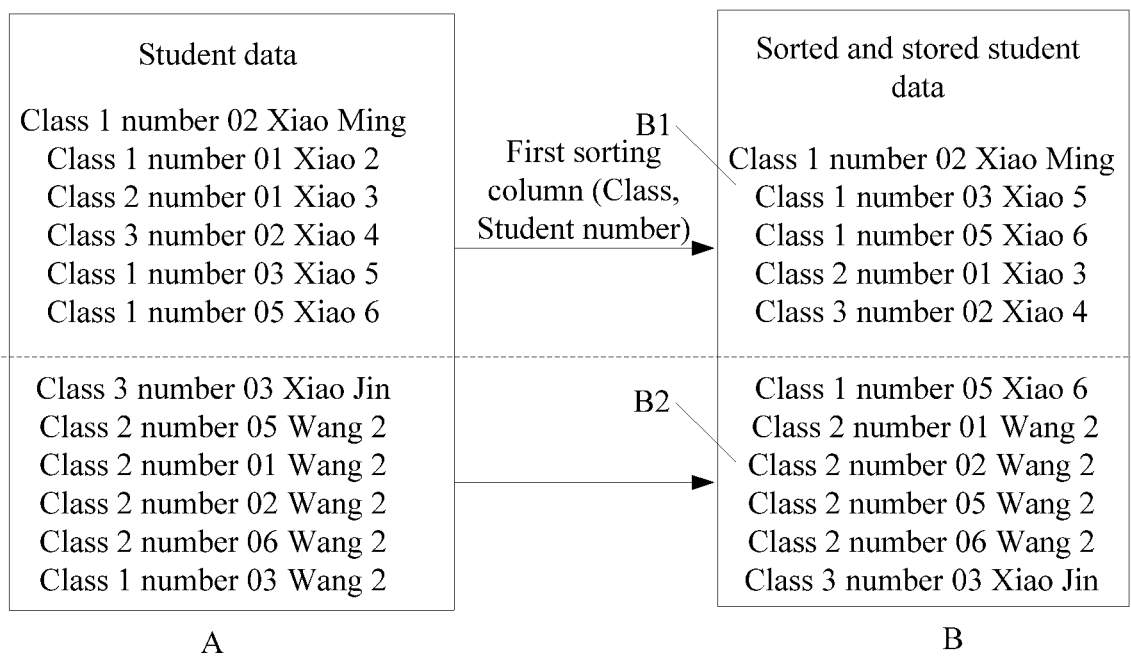
FIG. 9 is a second schematic diagram for storing data in a clustering manner according to an embodiment of the present invention.

It should be noted that, as shown in FIG. 9, A indicates unsorted data; and B indicates data that is obtained after being sorted and stored by using the clustering storage method provided in the embodiment of the present invention.

In a database system, a process of storing the first data in a clustering manner by using the clustering storage method provided in the embodiment of the present invention is specifically as follows:

(1) A computer node caches to-be-stored student data row by row into a local memory in the database system.

(2) The computer node determines that a first sorting column is the class and the student number, where the first sorting column is used to sort student data that has been cached in the local memory, and the sorting column is specified by a user according to an actual requirement.

(3) If the student data that has been cached in the local memory meets a preset condition provided in this embodiment of the present invention, the computer node sorts, according to a class and a student number of a student, the student data that has been cached in the local memory.

(4) The computer node stores, in a clustering manner into a storage medium in the database system, the sorted student data in the local memory.

(5) The computer node cyclically performs (1) to (4) until the to-be-stored student data is all sorted and stored part by part into the storage medium.

Exemplarily, in A shown in FIG. 9, there are 12 rows of to-be-stored student data, and the 12 rows of student data is non-sequentially stored. When the clustering storage method provided in the embodiment of the present invention is used to store the student data, the computer node may cache, starting from the first row of student data, the student data row by row into the local memory in the database system. It is assumed that only 6 rows of student data can be cached into the local memory each time, and when the computer node has cached 6 rows of student data into the local memory, the computer node may sort the 6 rows of student data, and store the sorted 6 rows of student data in a clustering manner into the storage medium in the database system, as shown in the B1 in FIG. 9. After the computer node completes storage of the 6 rows of student data, the computer node may continue to cache the other 6 rows of student data row by row into the local memory, sort the other 6 rows of student data after the caching is completed, and store the sorted other 6 rows of student data in a clustering manner into the storage medium, as shown in the B2 in FIG. 9. In this case, the computer node stores all the to-be-stored 12 rows of student data in a clustering manner into the storage medium, and the 12 rows of student data is partially and sequentially stored in the storage medium, as shown in B in FIG. 9.

Further, when caching the student data, the computer node may cache the student data according to a size of the local memory. Specifically, if a size of some rows of student data cached by the computer node at a time is relatively large, a quantity of rows of student data cached by the computer node at this time is relatively small; and on the contrary, if a size of some rows of student data cached by the computer node at a time is relatively small, a quantity of rows of student data cached by the computer node at this time is relatively large. Specifically, the size of student data cached by the computer node may be determined according to an actual situation, which is not limited in the present invention.

In the clustering storage method provided in the embodiment of the present invention, a computer node may cache to-be-stored data row by row according to a processing capability of a local memory in a database system, and when a part of data cached in the local memory is beyond the processing capability of the local memory, the computer node may start to sort the part of data according to a determined sorting column specified by a user, and store the sorted part of data in a storage medium in the database system. Because the computer node may sort the to-be-stored data part by part and store the sorted data, so as to complete data loading, it may be ensured that data in the storage medium is partially sequential, so that it can be ensured that data query performance and data compression efficiency are improved on the premise that data loading performance and data update performance are affected slightly.

It may be clearly understood by a person skilled in the art that, for the purpose of convenient and brief description, division of the foregoing functional modules is used as an example for illustration. In actual application, the foregoing functions may be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in the form of hardware, or may be implemented in the form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) or a processor (processor) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A storage method in a database system, comprising:
   caching a part of first data into a local memory in the database system;
   determining a first sorting column for sorting data that has been cached in the local memory;
   sorting second data according to the first sorting column when size, which is occupied by the second data, of the local memory is greater than or equal to a preset threshold, wherein the second data is the part of the first data, which has been cached into the local memory;
   storing the sorted second data into a storage medium in the database system;
   repeating the preceding steps until all parts of the first data have been stored into the storage medium; and
   wherein data stored each time into the storage medium is sequential and the first data stored in the storage medium as a whole is non-sequential.

2. The storage method according to claim 1, wherein sorting the second data according to the first sorting column comprises:

sorting the second data according to a numerical value of the first sorting column or a hash value of a numerical value of the first sorting column.

3. The storage method according to claim 1, wherein storing the sorted second data into a storage medium in the database system comprises:
storing the sorted second data into an idle physical block in the storage medium, wherein the idle physical block is a physical block except a physical block occupied by third data, and the third data is data, which has been stored into the storage medium prior to the second data, in the first data.

4. The storage method according to claim 1, wherein the first sorting column comprises at least one of: a physical column and an expression.

5. The storage method according to claim 1, wherein the method further comprises:
determining a query column; and
performing a query operation on the first data according to the query column.

6. The storage method according to claim 5, wherein after the determining a query column and before the performing a query operation on the first data according to the query column, the method further comprises:
reading the first data stored in the storage medium into the local memory; and
wherein the performing a query operation on the first data according to the query column comprises:
performing, in the local memory in a binary search manner, a query operation on each data page of one or more data pages of the first data according to the query column.

7. The storage method according to claim 1, wherein after all parts of the first data have been stored into the storage medium, the method further comprises:
determining a second sorting column; and
performing a sorting operation on the first data according to the second sorting column.

8. The storage method according to claim 7, wherein after the determining a second sorting column and before the performing a sorting operation on the first data according to the second sorting column, the method further comprises:
reading the first data stored in the storage medium into the local memory; wherein
the performing a sorting operation on the first data according to the first one in the first sorting column comprises:
performing, in the local memory, a merge sort on the first data according to the second sorting column.

9. The storage method according to claim 1, wherein after all parts of the first data have been stored into the storage medium, the method further comprises:
determining an aggregation column; and
performing an aggregation operation on the first data according to the aggregation column, wherein the aggregation operation is an operation of searching the first data for a maximum value or a minimum value.

10. The storage method according to claim 9, wherein after the determining an aggregation column and before the performing an aggregation operation on the first data according to the aggregation column, the method further comprises:
reading the first data stored in the storage medium into the local memory; wherein
the performing an aggregation operation on the first data according to the aggregation column comprises:
determining, in the local memory, a maximum value or a minimum value in each data page of one or more data pages of the first data according to the aggregation column; and
successively comparing the maximum value or the minimum value in each data page, so as to determine a maximum value or a minimum value in the first data.

11. The storage method according to claim 1, wherein before the caching first data into a local memory in the database system, the method further comprises:
creating a table in the storage medium, wherein the table is used to load the first data; and wherein the storing the sorted second data into a storage medium in the database system comprises:
inserting the sorted second data into the table, so as to store the sorted second data into the storage medium.

12. The storage method according to claim 1, wherein the first data is the data stored in a text in a hard disk.

13. A database system, comprising:
a bottom-layer storage medium;
a memory, coupled to the bottom-layer storage medium and configured to serve as a cache of the bottom-layer storage medium; and
a processor, coupled to the memory, wherein the processor executes an instruction in the memory, wherein the processor is configured to:
cache a part of first data into the memory; determine a first sorting column; sort second data according to the first sorting column when size, which is occupied by the second data, of the memory is greater than or equal to a preset threshold; store the sorted second data into the bottom-layer storage medium, wherein the second data is the part of the first data, which has been cached into the memory; and
repeat the preceding steps until all parts of the first data have been stored into the bottom-layer storage medium; wherein data stored each time into the bottom-layer storage medium is sequential and the first data stored in the bottom-layer storage medium as a whole is non-sequential.

14. The database system according to claim 13, wherein the processor is configured to sort the second data according to a numerical value of the first sorting column or a hash value of a numerical value of the first sorting column.

15. The database system according to claim 13, wherein the processor is configured to store the second data into an idle physical block in the bottom-layer storage medium, wherein the idle physical block is a physical block except a physical block occupied by third data, and the third data is data, which has been stored into the bottom-layer storage medium prior to the second data, in the first data.

16. The database system according to claim 13, wherein the first sorting column determined by the processor comprises at least one of: a physical column and an expression.

17. The database system according to claim 13, wherein the processor is further configured to: after all parts of the first data have been stored into the bottom-layer storage medium, determine a query column; and perform a query operation on the first data according to the query column.

18. The database system according to claim 17, wherein the processor is further configured to: after determining the query column and before performing the query operation on the query column, read the first data stored in the bottom-layer storage medium into the memory; and perform, in the memory in a binary search manner, a query operation on each data page of one or more data pages of the first data according to the query column.

19. The database system according to claim 13, wherein the processor is further configured to: after all parts of the first data have been stored into the bottom-layer storage medium, determine a second sorting column; and perform a sorting operation on the first data according to the second sorting column.

20. The database system according to claim 19, wherein the processor is further configured to: after determining the second sorting column and before performing the sorting operation on the first data according to the second sorting column, read the first data stored in the bottom-layer storage medium into the memory; and perform, in the memory, a merge sort on the first data according to the second sorting column.

21. The database system according to claim 13, wherein the processor is further configured to: after all parts of the first data have been stored into the bottom-layer storage medium, determine an aggregation column; and perform an aggregation operation on the first data according to the aggregation column, wherein the aggregation operation is an operation of searching the first data for a maximum value or a minimum value.

22. The database system according to claim 21, wherein the processor is further configured to: after determining the aggregation column and before performing the aggregation operation on the first data according to the aggregation column, read the first data stored in the bottom-layer storage medium into the memory; determine, in the memory, a maximum value or a minimum value in each data page of one or more data pages of the first data according to the aggregation column; and successively compare the maximum value or the minimum value in each data page, so as to determine a maximum value or a minimum value in the first data.

23. The database system according to claim 13, wherein the processor is further configured to: before the first data is cached into the memory, create a table in the bottom-layer storage medium; and insert the sorted second data row by row into the table, so as to store the sorted second data into the bottom-layer storage medium, wherein the table is used to load the first data.

* * * * *